United States Patent
Elshafie et al.

(10) Patent No.: US 12,267,831 B2
(45) Date of Patent: Apr. 1, 2025

(54) SIDELINK TRANSMISSIONS COHERENCY CONSIDERATIONS

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 17/648,802

(22) Filed: Jan. 24, 2022

(65) Prior Publication Data

US 2023/0239866 A1 Jul. 27, 2023

(51) Int. Cl.
*H04W 72/1268* (2023.01)
*H04L 5/00* (2006.01)
*H04W 72/20* (2023.01)

(52) U.S. Cl.
CPC ....... *H04W 72/1268* (2013.01); *H04L 5/0051* (2013.01); *H04W 72/20* (2023.01)

(58) Field of Classification Search
CPC .. H04L 5/0051; H04W 72/20; H04W 72/1268
See application file for complete search history.

(56) References Cited

U.S. PATENT DOCUMENTS

| | | | | |
|---|---|---|---|---|
| 2022/0394698 A1* | 12/2022 | Lee | ..................... | H04W 52/281 |
| 2023/0044215 A1* | 2/2023 | Wang | ................... | H04W 72/20 |
| 2023/0291523 A1* | 9/2023 | Hasegawa | ............. | H04L 5/0094 |

FOREIGN PATENT DOCUMENTS

WO 2021007239 A1 1/2021

OTHER PUBLICATIONS

ERICSSON: "Discussion on simultaneous SL and UL operation", 3GPP TSG RAN WG4 Meeting #92bis, R4-1912153, 3rd Generation Partnership Project (3GPP), Mobile Competence Centre, 650, Route Des Lucioles, F-06921 Sophia-Antipolis Cedex, France, vol. RAN WG4, No. Chongqing, China, Oct. 14, 2019-Oct. 18, 2019, 2 Pages, Oct. 4, 2019, XP051806884.
International Search Report and Written Opinion—PCT/US2023/010826—ISA/EPO—May 8, 2023.

(Continued)

*Primary Examiner* — Faruk Hamza
*Assistant Examiner* — Alan L Lindenbaum
(74) *Attorney, Agent, or Firm* — QUALCOMM Incorporated

(57) ABSTRACT

A first UE may schedule a first sidelink transmission and a second sidelink transmission. A first DMRS associated with the first sidelink transmission and a second DMRS associated with the second sidelink transmission may be bundled for channel estimation associated with a second UE. The first UE may schedule a first uplink transmission. The first uplink transmission may be TDMed or FDMed with at least one of the first sidelink transmission or the second sidelink transmission. The first UE may transmit at least one of the first sidelink transmission, the second sidelink transmission, or the first uplink transmission. The bundling of the first DMRS and the second DMRS may be maintained or canceled.

30 Claims, 13 Drawing Sheets

(56) References Cited

OTHER PUBLICATIONS

VIVO: "Discussion on PUCCH Enhancements", 3GPP TSG RAN WG1 #104-e, R1-2100460, 3rd Generation Partnership Project (3GPP), Mobile Competence Centre, 650, Route Des Lucioles, F-06921 Sophia-antipolis Cedex, France, vol. RAN WG1, No. e-Meeting, Jan. 25, 2021-Feb. 5, 2021, 6 Pages, Jan. 18, 2021, XP051970382, paragraphs [03 .1], [03. 2].

* cited by examiner

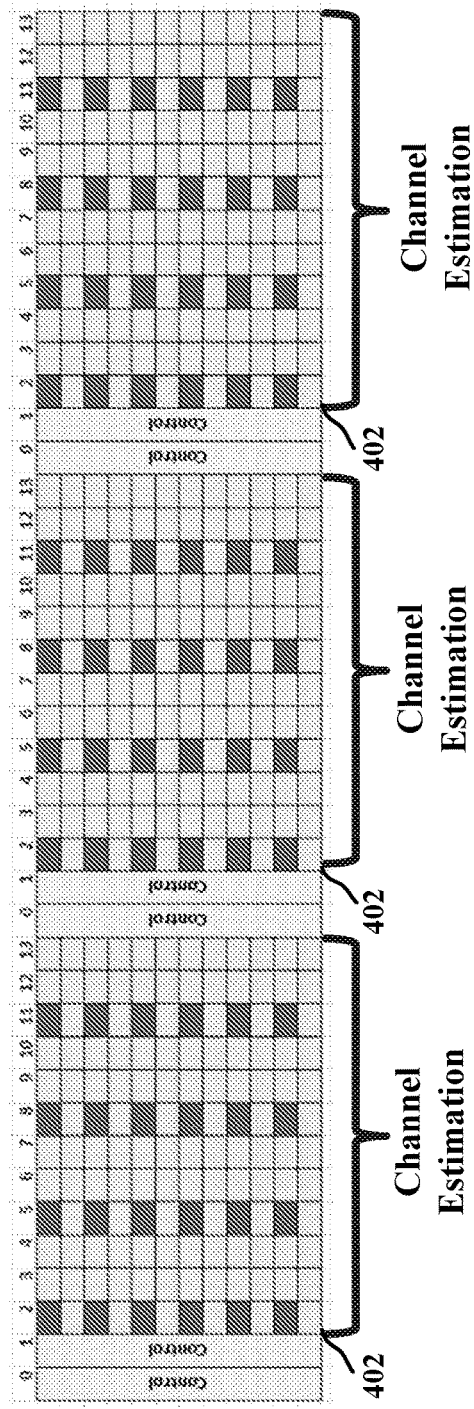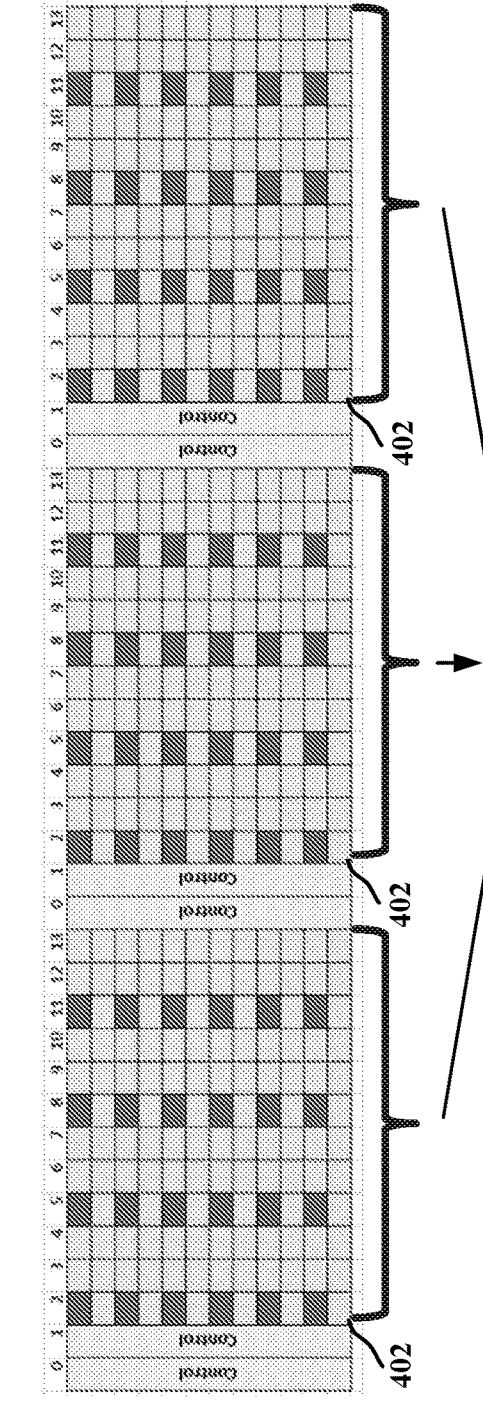
FIG. 4A
FIG. 4B

SIDELINK TRANSMISSIONS COHERENCY CONSIDERATIONS

TECHNICAL FIELD

The present disclosure relates generally to communication systems, and more particularly, to maintenance of phase coherency in sidelink transmissions in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE). The first UE may schedule a first sidelink transmission and a second sidelink transmission. A first demodulation reference signal (DMRS) associated with the first sidelink transmission and a second DMRS associated with the second sidelink transmission may be bundled for channel estimation associated with a second UE. The apparatus may schedule a first uplink transmission. The first uplink transmission may be time division multiplexed (TDMed) or frequency division multiplexed (FDMed) with at least one of the first sidelink transmission or the second sidelink transmission. The apparatus may transmit at least one of the first sidelink transmission, the second sidelink transmission, or the first uplink transmission. The bundling of the first DMRS and the second DMRS may be maintained or canceled.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram illustrating example channel estimation where DMRS bundling is not utilized.

FIG. 4B is a diagram illustrating example channel estimation where DMRS bundling is utilized.

DETAILED DESCRIPTION

Figure 1:
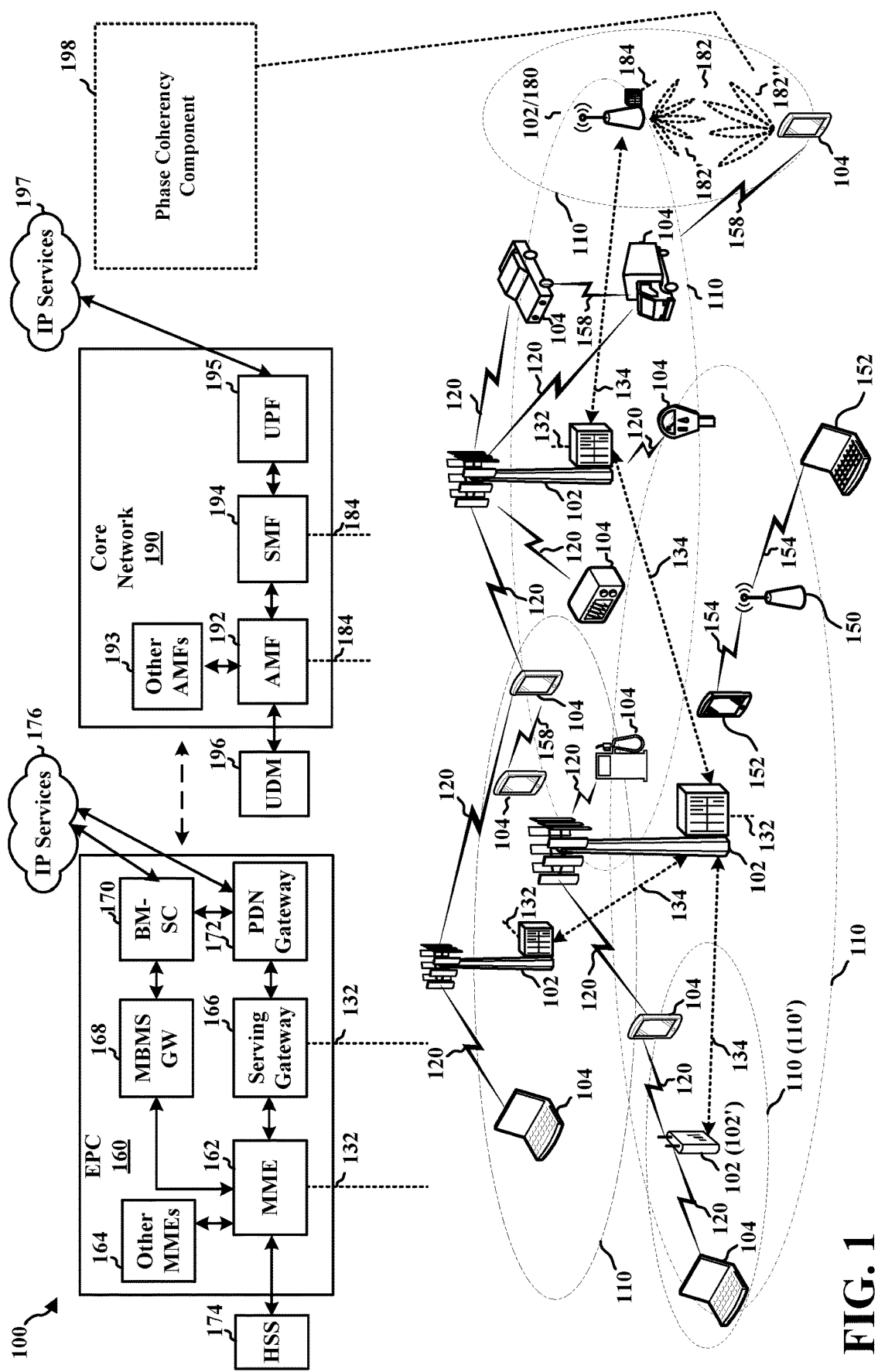
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first UE 104 may include a phase coherency component 198 that may be configured to schedule a first sidelink transmission and a second sidelink transmission. A first DMRS associated with the first sidelink transmission and a second DMRS associated with the second sidelink transmission may be bundled for channel estimation associated with a second UE. The phase coherency component 198 may be configured to schedule a first uplink transmission. The first uplink transmission may be TDMed or FDMed with at least one of the first sidelink transmission or the second sidelink transmission. The phase coherency component 198 may be configured to transmit at least one of the first sidelink transmission, the second sidelink transmission, or the first uplink transmission. The bundling of the first DMRS and the second DMRS may be maintained or canceled. Although the following description may be focused on 5G NR, the concepts described herein may be applicable to other similar areas, such as LTE, LTE-A, CDMA, GSM, and other wireless technologies.

Figure 2:
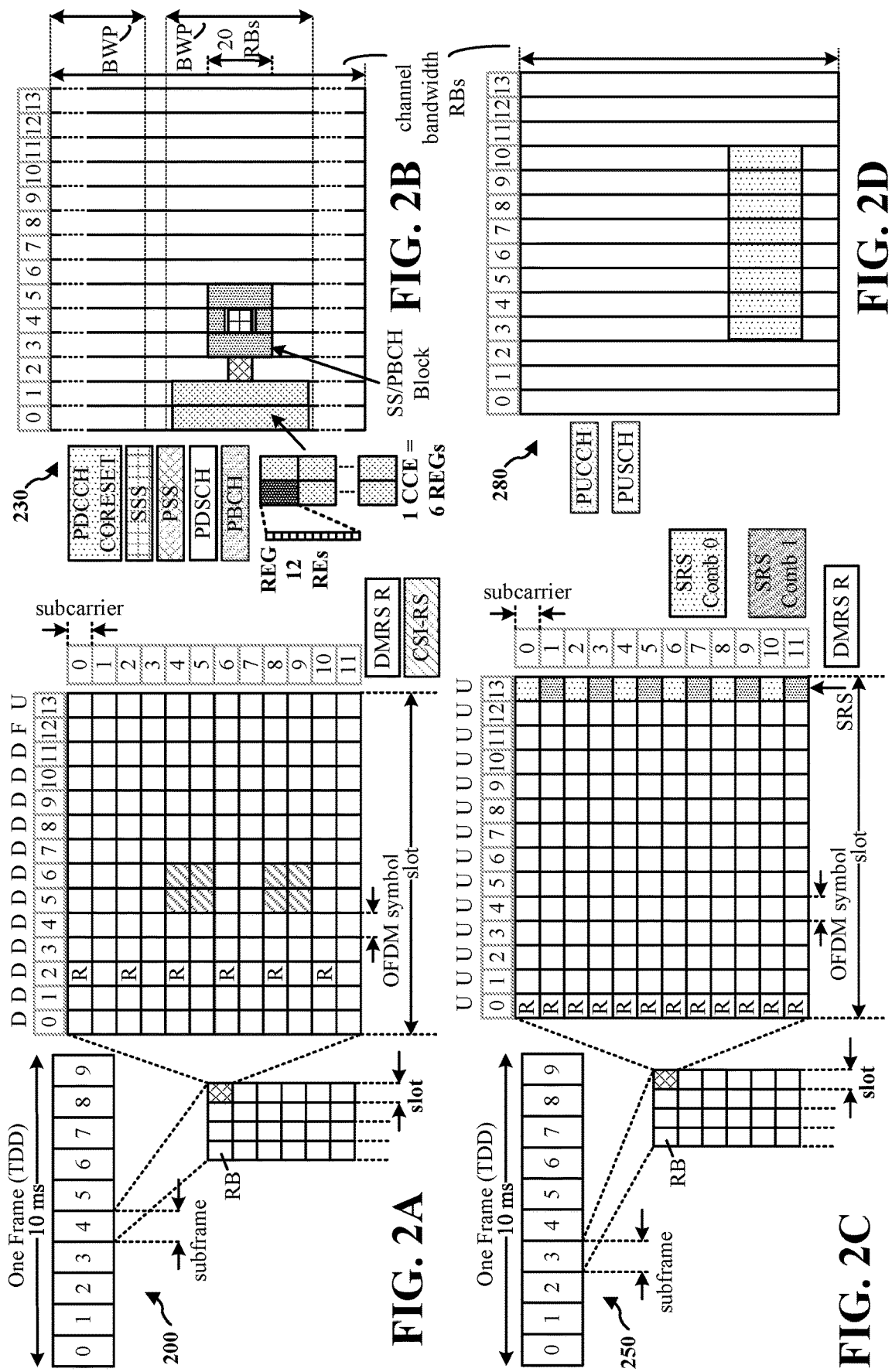
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
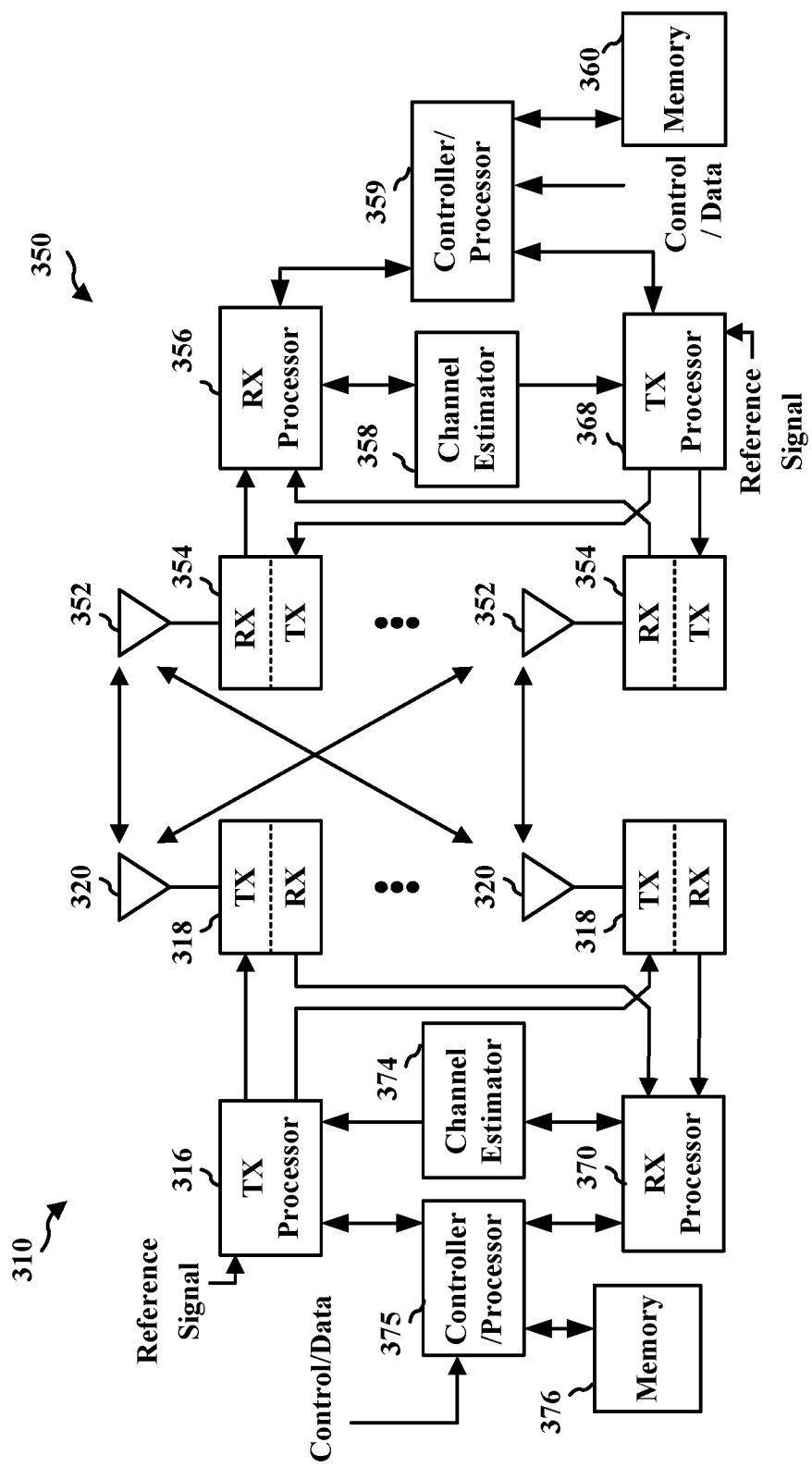
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

FIG. 4A is a diagram 400A illustrating example channel estimation where DMRS bundling is not utilized. As shown in FIG. 4A, a receiving device (e.g., a base station) may perform channel estimation for each transmission 402 (e.g., a PUSCH transmission or a PUCCH transmission) independently from the channel estimation for other transmissions. The channel estimation for a transmission 402 may be performed based on DMRSs associated with the same transmission 402. In other words, the DMRSs may not be bundled across different transmissions 402, and the DMRSs across different transmissions 402 may not be jointly processed by either the transmitting device or the receiving device.

FIG. 4B is a diagram 400B illustrating example channel estimation where DMRS bundling is utilized. As shown in FIG. 4B, a transmitting device (e.g., a UE) may jointly process DMRSs in multiple transmissions 402 (e.g., PUSCH transmissions or PUCCH transmissions). In particular, the transmitting device may jointly process DMRSs across multiple PUSCHs or may jointly process DMRSs across multiple PUCCHs. In one or more configurations, DMRSs associated with a PUSCH and DMRSs associated with a PUCCH may not be jointly processed. Accordingly, based on the joint processing of the DMRSs across multiple transmissions 402, the receiving device (e.g., a base station) may perform channel estimation jointly for the multiple transmissions 402. In other words, the DMRSs may be bundled across multiple transmissions 402.

To bundle the DMRSs across the multiple transmissions, the transmitting device may maintain phase continuity across the multiple transmissions. When phase continuity is maintained, channel statistics or characteristics may remain unchanged. In particular, to maintain phase continuity across the multiple transmissions, certain conditions may be met. Examples of the conditions may include a same frequency resource allocation, a same transmit power, a same spatial transmission relation, same antenna ports, and same precoding. A same transmit power may be used across multiple transmissions in order to maintain phase continuity because a different random phase may be introduced into the transmission when the state of the power amplifier in the transmit chain changes as a result of the change in the transmit power, and phase continuity may be disrupted by the new random phase. Therefore, when phase continuity cannot be maintained across multiple transmissions, the DMRSs associated with the multiple transmissions may not be bundled. Further, the receiving device may not leverage channel estimation for one transmission when performing channel estimation for another transmission. Herein phase continuity may also be referred to as phase coherency, and the two terms may be used interchangeably.

Figure 5:
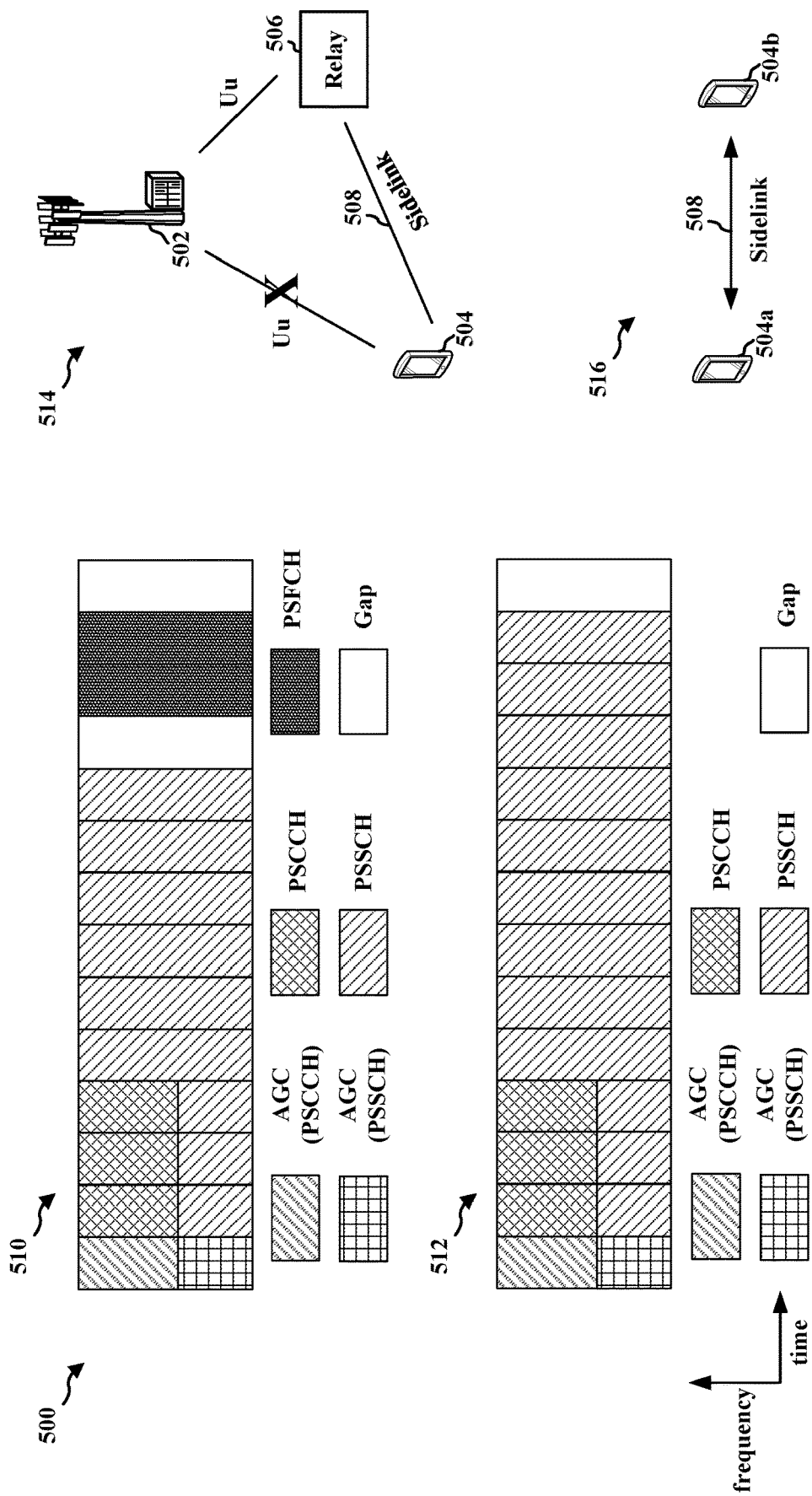
FIG. 5 is a diagram illustrating various example aspects associated with sidelink transmissions.

FIG. 5 is a diagram 500 illustrating various example aspects associated with sidelink transmissions. With a sidelink transmission, a UE may communicate directly with another UE without routing by a base station. The sidelink communication may be optimized for vehicle-to-everything (V2X) applications. In one or more examples, as shown at 514, when a direct radio link (e.g., a Uu link) between a base station 502 and a UE 504 does not work properly, the UE 504 may gain access to the base station 502 and the network via a relay 506 (e.g., a relay UE). The link between the UE 504 and the relay 506 may be a sidelink 508 (e.g., a sidelink associated with the PC5 interface). Further, the link between the relay 506 and the base station 502 may be a direct radio link (e.g., a Uu link). In one or more examples, as shown at 516, a direct sidelink connection 508 may be established between a first UE 504a and a second UE 504b for direct sidelink communications between the two UEs 504a and 504b.

The resource allocation associated with various channels associated sidelink communications are shown at 510 and 512. In a slot 510 or 512 associated with sidelink communication, the first symbol may be an automatic gain control (AGC) symbol. An RX UE may train its AGC setting based on the AGC symbol. In some examples, the AGC symbol may include the same content as the symbol directly after the AGC symbol. A sidelink control information (SCI) message may be provided in a first stage and a second stage. The first stage may be referred to as SCI-1 and the second stage may be referred to as SCI-2. SCI-1 may be transmitted via a physical sidelink control channel (PSCCH). The PSCCH may span 2 or 3 symbols after the AGC symbol, and may be FDMed with a physical sidelink shared channel (PSSCH). SCI-1 may include a resource allocation, and may include information for decoding the SCI-2 (e.g., a format of SCI-2 and/or other information). The resource allocation may indicate resources for the SCI-2 and/or a shared channel (SCH) (e.g., a PSSCH). The SCI-2 may be transmitted via a PSSCH. The SCI-2 may include information for decoding the SCH. In some aspects, SCI-2 may be mapped to contiguous RBs in the PSSCH, starting from a first symbol with a PSSCH DMRS. In some aspects, the SCI-2 may be scrambled separately from the SCH. Further, a recipient UE associated with a sidelink transmission may provide a HARQ-ACK feedback via a physical sidelink feedback channel (PSFCH). As shown at 510, a gap may be configured between a PSSCH and a PSFCH. Further, as shown at 510 and 512, a gap may be configured at the end of the sidelink resource allocation.

Two sidelink resource allocation modes may be used for sidelink communications. A first mode may be referred to as Mode 1, and may include dynamic grant modes and configured grant modes. A second mode may be referred to as Mode 2. In the first mode, a base station may provide a resource grant to a relay UE (e.g., the relay 506), and the relay UE may perform sidelink communications with the remote UE (e.g., the UE 504) using the resource grant. In the second mode, one or more resource pools may be preconfigured for sidelink communications between a first UE (e.g., the first UE 504a) and the second UE (e.g., the second UE 504b). The first UE and the second UE may utilize the one or more resource pools using sensing and resource reservation techniques to perform the sidelink communications. Each resource pool may include a number of RBs, and may be associated with its respective configuration (e.g., a transmit power configuration, a resource allocation mode configuration, etc.). The second mode may involve less communication with a central entity, such as a base station, than the first mode, whereas the first mode may involve less overhead associated with sensing and resource reservation techniques.

In one or more configurations, when Mode 2 is used for sidelink resource allocation, a UE may perform resource sensing to identify resources for the sidelink transmission. The sidelink transmission may be TDMed or FDMed with an uplink transmission. In this case, the base station may not be aware of sidelink resources used for the sidelink transmission. In addition to the sidelink resource allocation Mode 2, aspects described herein may also be applied to scenarios where configured grants (e.g., type 1 or type 2) or sidelink resource allocation Mode 1 is utilized. It should be appreciated that when configured grants are used, predesignated resources may be set aside for a particular transmitting device.

Figure 6A:
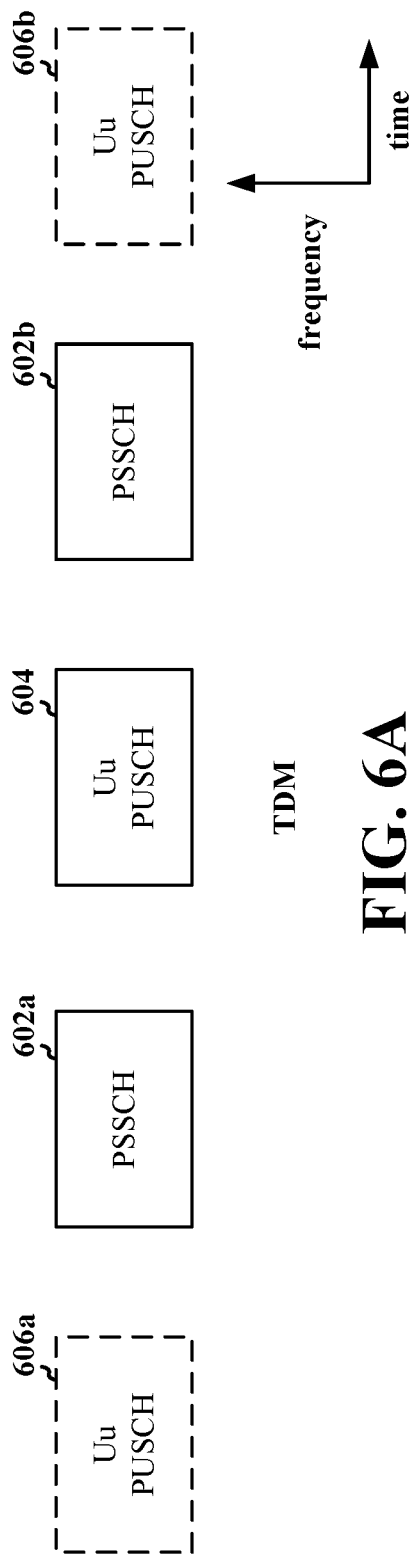
FIG. 6A is a diagram illustrating example sidelink transmissions TDMed with one or more example uplink transmissions.

FIG. 6A is a diagram 600A illustrating example sidelink transmissions TDMed with one or more example uplink transmissions. As shown in FIG. 6A, two sidelink transmissions 602a and 602b (e.g., PSSCH transmissions) to a receiving UE may be scheduled. The DMRSs associated with the two sidelink transmissions 602a and 602b may be bundled for joint channel estimation. Further, based on a schedule, an uplink transmission 604 (e.g., a PUSCH transmission) may be TDMed with the sidelink transmissions 602a and 602b. In particular, the uplink transmission 604 may be located, in time, in a time gap between the two sidelink transmissions 602a and 602b. The presence of the uplink transmission 604 may affect the ability of the transmitting UE to maintain phase continuity across the two sidelink transmissions 602a and 602b. Further still, based on a schedule, a second uplink transmission 606a or 606b may be TDMed with the sidelink transmissions 602a and 602b. In one example, a second uplink transmission 606a may be located, in time, before the first sidelink transmission 602a. In another example, a second uplink transmission 606b may be located, in time, after the second sidelink transmission 602b. In one or more configurations, DMRSs associated with the uplink transmission 604 and one second uplink transmission 606a or 606b may also be bundled for joint channel estimation.

Figure 6B:
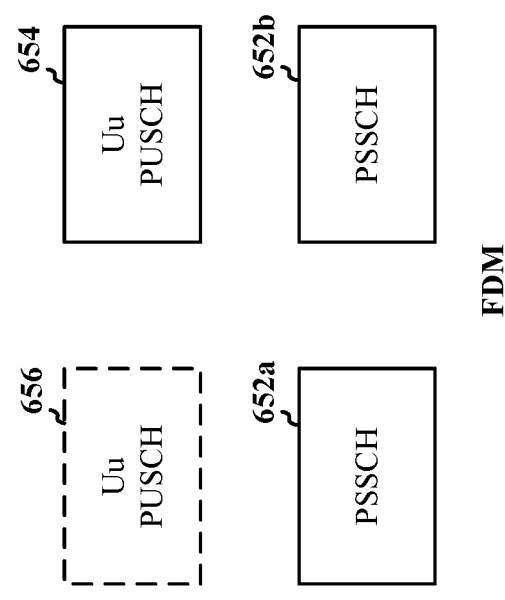
FIG. 6B is a diagram illustrating example sidelink transmissions FDMed with one or more example uplink transmissions.

FIG. 6B is a diagram 600B illustrating example sidelink transmissions FDMed with one or more example uplink transmissions. As shown in FIG. 6B, two sidelink transmissions 652a and 652b (e.g., PSSCH transmissions) to a receiving UE may be scheduled. The DMRSs associated with the two sidelink transmissions 652a and 652b may be bundled for joint channel estimation. Further, based on a schedule, an uplink transmission 654 (e.g., a PUSCH transmission) may be FDMed with one of the sidelink transmissions 652a or 652b. The uplink transmission 654 may partially or fully overlap in time with one of the sidelink transmissions 652a or 652b. Although in FIG. 6B, the uplink transmission 654 is shown as being FDMed and fully overlapping in time with the second sidelink transmission 652b, in other examples the uplink transmission 654 may be FDMed with the first sidelink transmission 652a. Further, the uplink transmission 654 may partially, not fully, overlap in time with one of the sidelink transmissions 652a or 652b. The presence of the uplink transmission 604 may affect the ability of the transmitting UE to maintain phase continuity across the two sidelink transmissions 652a and 652b. Further still, based on a schedule, a second uplink transmission 656 may be FDMed with and may partially or fully overlap in time with the other of the sidelink transmissions 602a and 602b. For example, if the uplink transmission 654 is FDMed with the second sidelink transmission 652b, the second uplink transmission 656 may be FDMed with the first sidelink transmission 652a. In one or more configurations, DMRSs associated with the uplink transmission 654 and the second uplink transmission 656 may also be bundled for joint channel estimation.

For sidelink DMRS bundling (e.g., across multiple PSSCH transmissions), the transmitting UE may maintain phase continuity across the set of sidelink transmissions. The presence of one or more uplink transmissions within a time domain window associated with the sidelink DMRS bundling (e.g., when an uplink transmission is scheduled to occur close to (or time-overlapping with) one of the sidelink transmissions) may affect the ability of or the feasibility for the transmitting UE to maintain phase continuity across the multiple sidelink transmissions.

Figure 7:
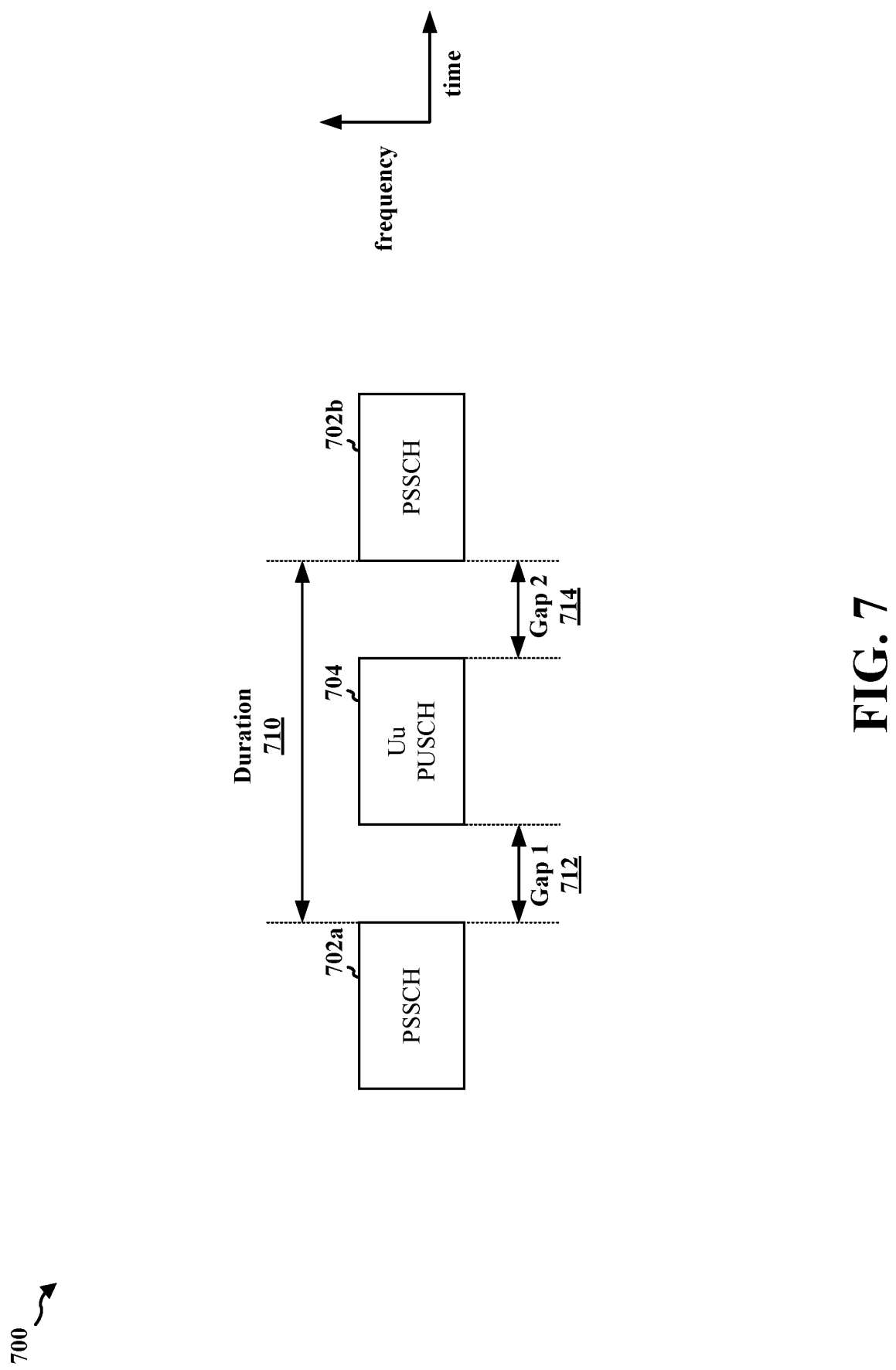
FIG. 7 is a diagram illustrating example sidelink transmissions TDMed with an example uplink transmission.

FIG. 7 is a diagram 700 illustrating example sidelink transmissions TDMed with an example uplink transmission. The two sidelink transmissions 702a and 702b (e.g., PSSCH transmissions) to a receiving UE may be scheduled. Further, based on the schedule, DMRSs associated with the two sidelink transmissions 702a and 702b may be bundled for joint channel estimation. In other words, based on the schedule, the transmitting UE may maintain phase continuity across the two sidelink transmissions 702a and 702b. An uplink transmission 704 (e.g., a PUSCH transmission) may be scheduled to occur between the two adjacent sidelink transmissions 702a and 702b. In other words, the uplink transmission 704 may be located, in time, in a time gap between the two sidelink transmissions 702a and 702b. The duration 710 may relate to the length of the time gap between the two sidelink transmissions 702a and 702b. Further, based on the schedule, a first time gap 712 may exist between the first sidelink transmission 702a and the uplink transmission 704. Further still, a second time gap 714 may exist between uplink transmission 704 and the second sidelink transmission 702b. The presence of the scheduled uplink transmission 704 may affect the phase coherency associated with the scheduled sidelink transmissions 702a and 702b.

In one configuration, if the duration 710 is greater than a threshold (e.g., 14 symbols), the transmitting UE may transmit the two sidelink transmissions 702a and 702b as well as the uplink transmission 704. In this case, it may be likely that phase continuity may not be maintained across the two sidelink transmissions 702a and 702b because maintaining the state of the power amplifier in the transmit chain throughout the duration 710 may be associated with an unacceptable level of wasted power. Therefore, the bundling of the DMRSs associated with the two sidelink transmissions 702a and 702b may be canceled.

In one configuration, if the duration 710 is less than the threshold (e.g., 14 symbols), the transmitting UE may cancel (drop) the uplink transmission 704. Further, the transmitting UE may transmit the two sidelink transmissions 702a and 702b with the bundling of the DMRSs associated with the two sidelink transmissions 702a and 702b maintained. In one or more examples, the transmitting UE may cancel the uplink transmission 704 in response to a priority associated with the uplink transmission 704 being lower than a priority threshold or a priority associated with at least one of the sidelink transmissions 702a and 702b, or the uplink transmission 704 being a repetition (e.g., a repeated transmission that contains the same information as a previous uplink transmission).

In one configuration, if the duration 710 is less than the threshold (e.g., 14 symbols), if the transmitting UE is capable (e.g., based on a UE capability), the transmitting UE may transmit the two sidelink transmissions 702a and 702b as well as the uplink transmission 704 and, at the same time, maintain the bundling of the DMRSs associated with the two sidelink transmissions 702a and 702b. In other words, based on a UE capability, the transmitting UE may transmit the two sidelink transmissions 702a and 702b and the uplink transmission 704 while maintaining the phase coherency/continuity for the sidelink transmissions 702a and 702b. In one configuration, the transmitting UE may be capable of maintaining the bundling of the DMRSs associated with the two sidelink transmissions 702a and 702b if the duration of a second time gap 714 is less than a threshold.

Figure 8:
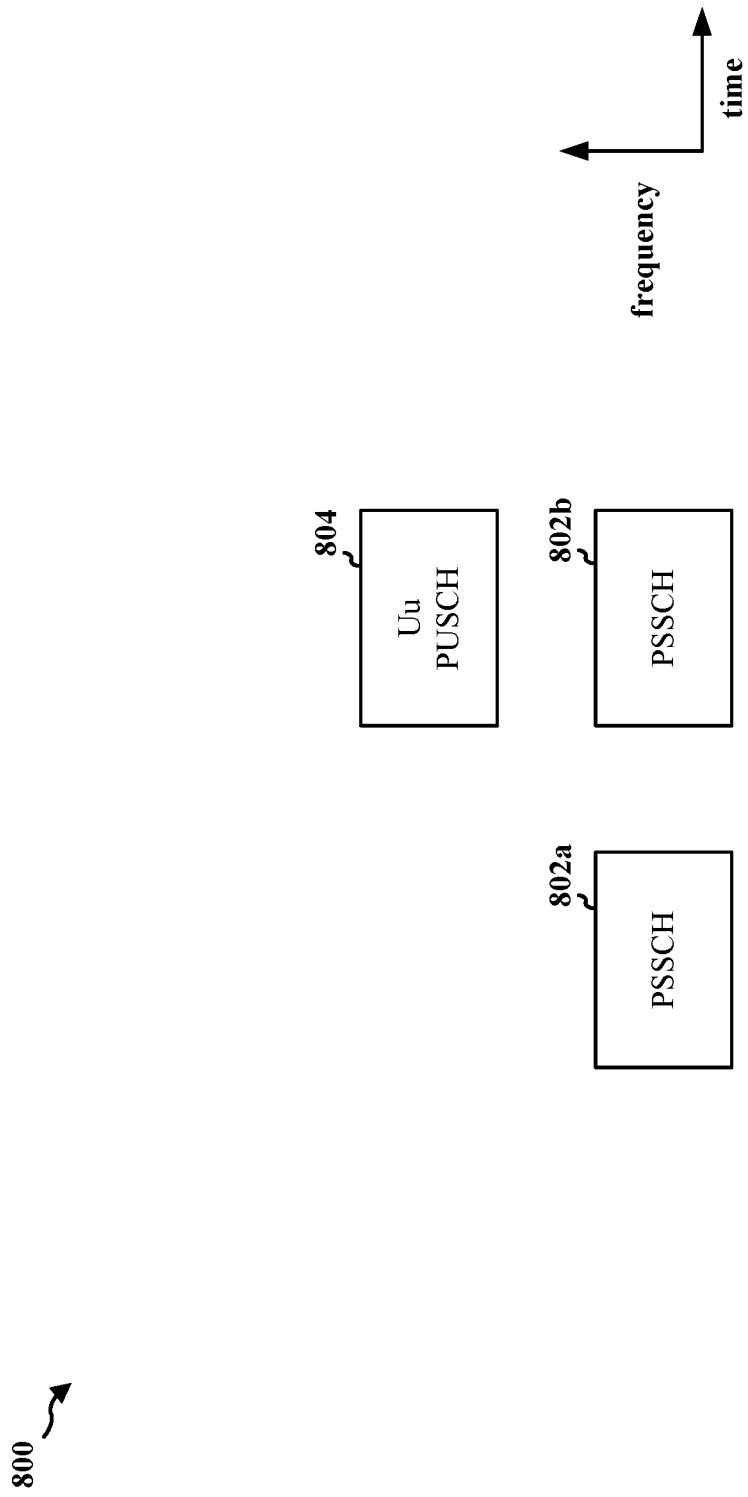
FIG. 8 is a diagram illustrating example sidelink transmissions FDMed with an example uplink transmission.

FIG. 8 is a diagram 800 illustrating example sidelink transmissions FDMed with an example uplink transmission. The two sidelink transmissions 802a and 802b (e.g., PSSCH transmissions) to a receiving UE may be scheduled. Further, based on the schedule, DMRSs associated with the two sidelink transmissions 802a and 802b may be bundled for joint channel estimation. In other words, based on the schedule, the transmitting UE may maintain phase continuity across the two sidelink transmissions 802a and 802b. An uplink transmission 804 (e.g., a PUSCH transmission) may be scheduled to be FDMed with and may partially or fully overlap in time with one of the sidelink transmissions 802a and 802b. Although in FIG. 8, the uplink transmission 804 is shown as being FDMed with the second sidelink transmission 802b, in other examples the uplink transmission 804 may also be FDMed with the first sidelink transmission 802a. The presence of the scheduled uplink transmission 804 may affect the phase coherency associated with the scheduled sidelink transmissions 802a and 802b.

In one configuration, if 1) the DMRS associated with the uplink transmission 804 is not bundled with another DMRS associated with another uplink transmission for joint channel estimation, 2) the uplink transmission 804 is not a repetition, or 3) a priority associated with the uplink transmission 804 is greater than a priority threshold or a priority associated with at least one of the sidelink transmissions 802a and 802b, the transmitting UE may transmit the uplink transmission 804 and the two sidelink transmissions 802a and 802b with the bundling of the DMRSs associated with the sidelink transmissions 802a and 802b maintained. In particular, based on a maximum total transmit power, the transmitting UE may configure a transmit power for the sidelink transmissions 802a and 802b (which may be transmitted with a same transmit power to maintain the phase coherency) first, and then may configure the uplink transmission 804 with the remaining transmit power. If there is not sufficient remaining transmit power, the transmitting UE may cancel the uplink transmission 804.

In one configuration, if the uplink transmission 804 is a repetition, or if a priority associated with the uplink transmission 804 is less than a priority threshold or a priority associated with at least one of the sidelink transmissions 802a and 802b, the transmitting UE may cancel (drop) the uplink transmission 804. Further, the transmitting UE may transmit the two sidelink transmissions 802a and 802b with the bundling of the DMRSs associated with the sidelink transmissions 802a and 802b maintained.

In one configuration, the transmitting UE may transmit the uplink transmission 804 and the two sidelink transmissions 802a and 802b. However, at the same time, the transmitting UE may cancel the bundling of the DMRSs associated with the sidelink transmissions 802a and 802b. In one configuration, the transmitting UE may indicate, to the receiving UE (e.g., via an SCI message), that there may not be phase continuity associated with the sidelink transmissions 802a and 802b. In another configuration, the transmitting UE may not indicate to the receiving UE that there may not be phase continuity associated with the sidelink transmissions 802a and 802b.

In one or more configurations, as having been described above in relation to FIGS. 6A and 6B, a second uplink transmission 606a, 606b, or 656 may be scheduled to be transmitted by the transmitting UE. Further, the DMRS associated with the second uplink transmission 606a, 606b, or 656 may be bundled with the DMRS associated with the (first) uplink transmission 604 or 654 for joint channel estimation. In order to bundle the DMRSs associated with the uplink transmissions, the transmitting UE may maintain phase continuity across the uplink transmissions.

In one configuration, the transmitting UE may indicate, to at least one of the base station or the receiving UE, a UE capability of the transmitting UE to maintain one or both of the bundling of the DMRSs associated with the sidelink transmissions and the bundling of the DMRSs associated with the uplink transmissions. For example, the transmitting UE may indicate, to at least one of the base station or the receiving UE, whether or not the transmitting UE is capable of maintaining one or both of the bundling of the DMRSs associated with the sidelink transmissions and the bundling of the DMRSs associated with the uplink transmissions. The UE capability to maintain DMRS bundling may be in relation to at least one of a frequency range, a band, a band combination, a carrier, or a carrier combination. In one configuration, if the transmitting UE is not capable of maintaining both the bundling of the DMRSs associated with the sidelink transmissions and the bundling of the DMRSs associated with the uplink transmissions, the bundling of the DMRSs associated with the sidelink transmissions may be canceled. The cancelation of the bundling of the DMRSs associated with the sidelink transmissions may be based on an indication from the base station.

In one or more configurations, as shown in FIG. 6B, two sidelink transmissions 652a and 652b (e.g., PSSCH transmissions) to a receiving UE may be scheduled. The DMRSs associated with the two sidelink transmissions 652a and 652b may be bundled for joint channel estimation. Further, based on a schedule, a first uplink transmission 654 (e.g., a PUSCH transmission) may be FDMed with one of the sidelink transmissions 652a or 652b. The first uplink transmission 654 may partially or fully overlap in time with one of the sidelink transmissions 652a or 652b. Further still, based on a schedule, a second uplink transmission 656 may be FDMed with and may partially or fully overlap in time with the other of the sidelink transmissions 602a and 602b. For example, if the first uplink transmission 654 is FDMed with the second sidelink transmission 652b, the second uplink transmission 656 may be FDMed with the first sidelink transmission 652a. The DMRSs associated with the first uplink transmission 654 and the second uplink transmission 656 may also be bundled for joint channel estimation.

In one configuration, the transmitting UE may transmit both uplink transmissions 654 and 656 and both sidelink transmissions 652a and 652b. Further, based on a maximum total transmit power, the transmitting UE may configure a transmit power for the uplink transmissions 654 and 656 (which may be transmitted with a same transmit power to maintain phase continuity) first, and then may configure the sidelink transmissions 652a and 652b with the remaining transmit power. If there is not sufficient remaining transmit power, the transmitting UE may cancel at least one of the sidelink transmissions 652a or 652b. Accordingly, the bundling of the DMRSs associated with the uplink transmissions 654 and 656 may be maintained. Further, in different configurations, the bundling of the DMRSs associated with the sidelink transmissions 652a and 652b may or may not be maintained.

In one configuration, the transmitting UE may transmit uplink transmissions 654 and 656. Further, the transmitting UE may cancel (drop) at least one of the sidelink transmissions 652a or 652b. Accordingly, the bundling of the DMRSs associated with the uplink transmissions 654 and 656 may be maintained.

In one configuration, the transmitting UE may transmit both uplink transmissions 654 and 656 and both sidelink transmissions 652a and 652b. Further, the bundling of the DMRSs associated with the uplink transmissions 654 and 656 may be maintained. However, the bundling of the DMRSs associated with the sidelink transmissions 652a and 652b may be canceled. In one configuration, the transmitting UE may indicate, to the receiving UE (e.g., via an SCI message), that there may not be phase continuity associated with the sidelink transmissions 652a and 652b. In another configuration, the transmitting UE may not indicate to the receiving UE that there may not be phase continuity associated with the sidelink transmissions 652a and 652b.

In one configuration, if at least one of the uplink transmissions 654 or 656 is a repetition, or if a priority associated with at least one of the uplink transmissions 654 or 656 is less than a priority threshold or a priority associated with at least one of the sidelink transmissions 652a and 652b, the transmitting UE may transmit the sidelink transmissions 652a and 652b. Further, the transmitting UE may cancel (drop) at least one of the uplink transmissions 654 or 656 that may be a repetition or associated with a low priority. Accordingly, the bundling of the DMRSs associated with the sidelink transmissions 652a and 652b may be maintained.

In one configuration, the transmitting UE may transmit both uplink transmissions 654 and 656 and both sidelink transmissions 652a and 652b. Further, based on a maximum total transmit power, the transmitting UE may configure a transmit power for the sidelink transmissions 652a and 652b (which may be transmitted with a same transmit power to maintain phase continuity) first, and then may configure the uplink transmissions 654 and 656 with the remaining transmit power. If there is not sufficient remaining transmit power, the transmitting UE may cancel at least one of the uplink transmissions 654 or 656. Accordingly, the bundling of the DMRSs associated with the sidelink transmissions 652a and 652b may be maintained. Further, in different configurations, the bundling of the DMRSs associated with the uplink transmissions 654 and 656 may or may not be maintained. In one or more examples, the transmitting UE may prioritize the configuration of the transmit power for the sidelink transmissions 652a and 652b in response to at least one of the uplink transmissions 654 or 656 being a repetition or a priority associated with at least one of the uplink transmissions 654 or 656 being less than a priority threshold or a priority associated with at least one of the sidelink transmissions 652a and 652b.

In one or more configurations, as shown in FIG. 6A, two sidelink transmissions 602a and 602b (e.g., PSSCH transmissions) to a receiving UE may be scheduled. The DMRSs associated with the two sidelink transmissions 602a and 602b may be bundled for joint channel estimation. Further, based on a schedule, a first uplink transmission 604 (e.g., a PUSCH transmission) may be TDMed with the sidelink transmissions 602a and 602b. In particular, the first uplink transmission 604 may be located, in time, in a time gap between the two sidelink transmissions 602a and 602b. Further still, based on a schedule, a second uplink transmission 606a or 606b may be TDMed with the sidelink transmissions 602a and 602b. In one example, a second uplink transmission 606a may be located, in time, before the first sidelink transmission 602a. In another example, a second uplink transmission 606b may be located, in time, after the second sidelink transmission 602b. In one or more configurations, DMRSs associated with the first uplink transmission 604 and one second uplink transmission 606a or 606b may also be bundled for joint channel estimation.

In one or more configurations, for the scenario illustrated in FIG. 6A, the transmitting UE may perform one or more operations similar to the operations performed in relation to the scenario illustrated in FIG. 7. For example, the transmitting UE may transmit both sidelink transmissions 602a and 602b. In different configurations, the bundling of the DMRSs associated with the sidelink transmissions 602a and 602b may or may not be maintained. In a further example, the transmitting UE may cancel at least one of the sidelink transmissions 602a or 602b. In an additional example, the transmitting UE may transmit both uplink transmissions 604 and 606a/606b. In different configurations, the bundling of the DMRSs associated with the uplink transmissions 604 and 606a/606b may or may not be maintained. In a further example, the transmitting UE may cancel at least one of the uplink transmissions 604 or 606a/606b. In different configurations, the transmitting UE may prioritize the configuration of the transmit power for the sidelink transmissions 602a and 602b or the uplink transmissions 604 and 606a/606b. Phase continuity of the transmissions (sidelink or uplink) for which transmit power configuration is prioritized may be maintained. In one or more configurations, the operations performed by the transmitting UE may be based on at least one of a duration of the time gap between the two sidelink transmissions 602a and 602b, a duration of the time gap between the two uplink transmissions 604 and 606a/606b, a duration of the time gap between the first uplink transmission 604 and the second sidelink transmission 602b, a priority associated with at least one of the uplink transmissions 604 or 606a/606b, a priority associated with at least one of the sidelink transmissions 602a or 602b, a status associated with at least one of the uplink transmissions 604 or 606a/606b (e.g., whether an uplink transmission is a repetition), or a UE capability of the transmitting UE.

Figure 9:
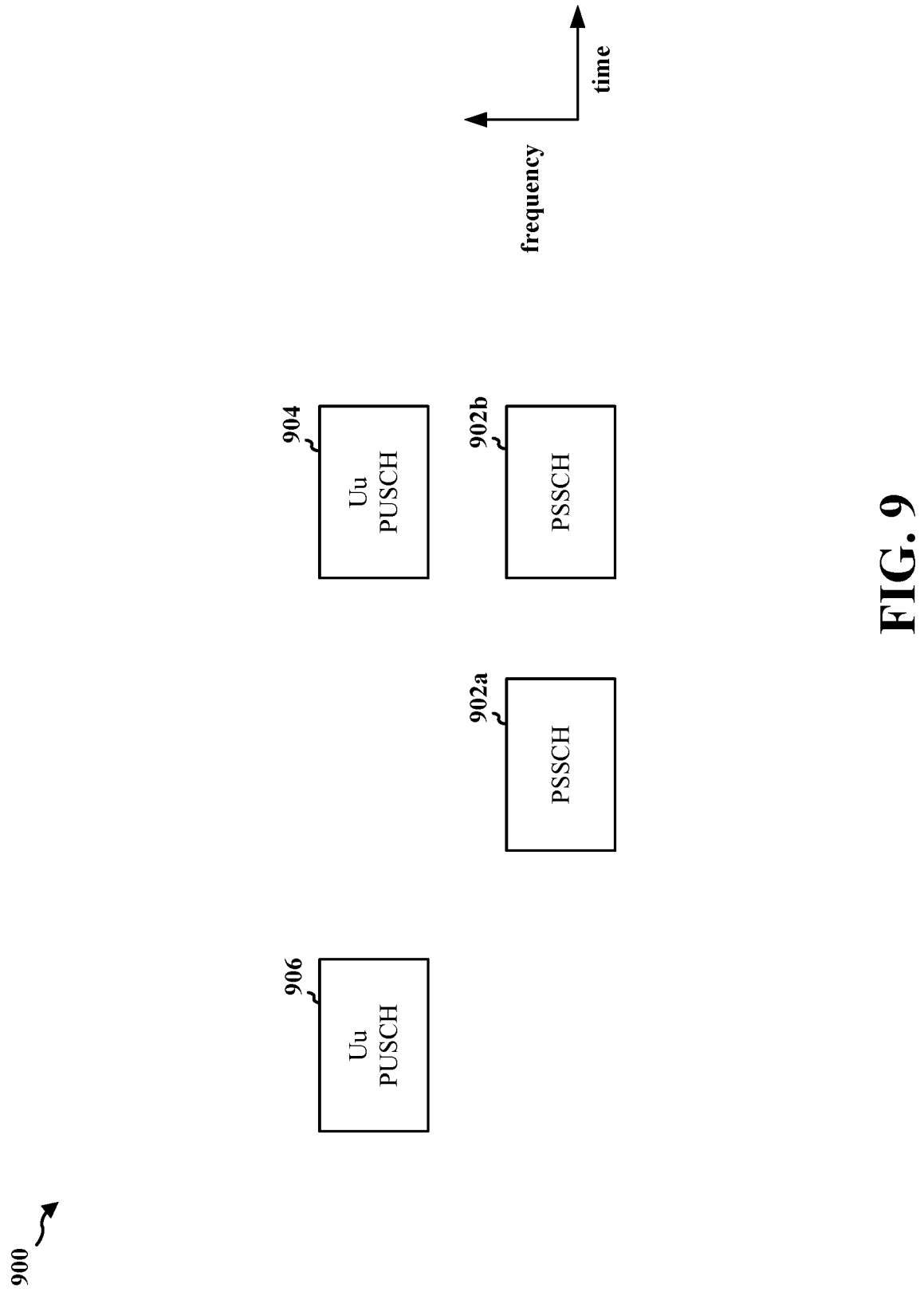
FIG. 9 is a diagram illustrating example sidelink transmissions TDMed and FDMed with example uplink transmissions.

FIG. 9 is a diagram 900 illustrating example sidelink transmissions TDMed and FDMed with example uplink transmissions. The two sidelink transmissions 902a and 902b (e.g., PSSCH transmissions) to a receiving UE may be scheduled. Further, based on the schedule, DMRSs associated with the two sidelink transmissions 902a and 902b may be bundled for joint channel estimation. In other words, based on the schedule, the transmitting UE may maintain phase continuity across the two sidelink transmissions 902a and 902b. A first uplink transmission 904 (e.g., a PUSCH transmission) may be scheduled to be FDMed with and may partially or fully overlap in time with at least one of the sidelink transmissions 902a and 902b. Further, a second uplink transmission 906 may be scheduled. DMRSs associated with the first uplink transmission 904 and the second uplink transmission 906 may also be bundled for joint channel estimation. In one or more examples, the second uplink transmission 906 may neither overlap in time nor overlap in frequency with the sidelink transmissions 902a or 902b.

In one or more configurations, for the scenario illustrated in FIG. 9, the transmitting UE may perform one or more operations similar to the operations performed in relation to the scenarios illustrated in FIGS. 6A and 6B. For example, the transmitting UE may transmit both sidelink transmissions 902a and 902b. In different configurations, the bundling of the DMRSs associated with the sidelink transmissions 902a and 902b may or may not be maintained. In a further example, the transmitting UE may cancel at least one of the sidelink transmissions 902a or 902b. In an additional example, the transmitting UE may transmit both uplink transmissions 904 and 906. In different configurations, the bundling of the DMRSs associated with the uplink transmissions 904 and 906 may or may not be maintained. In a further example, the transmitting UE may cancel at least one of the uplink transmissions 904 or 906. In different configurations, the transmitting UE may prioritize the configuration of the transmit power for the sidelink transmissions 902a and 902b or the uplink transmissions 904 and 906. Phase continuity of the transmissions (sidelink or uplink) for which transmit power configuration is prioritized may be maintained. In one or more configurations, the operations performed by the transmitting UE may be based on at least one of a duration of the time gap between the two sidelink transmissions 902a and 902b, a duration of the time gap between the two uplink transmissions 904 and 906, a priority associated with at least one of the uplink transmissions 904 or 906, a priority associated with at least one of the sidelink transmissions 902a or 902b, a status associated with at least one of the uplink transmissions 904 or 906 (e.g., whether an uplink transmission is a repetition), or a UE capability of the transmitting UE.

Figure 10:
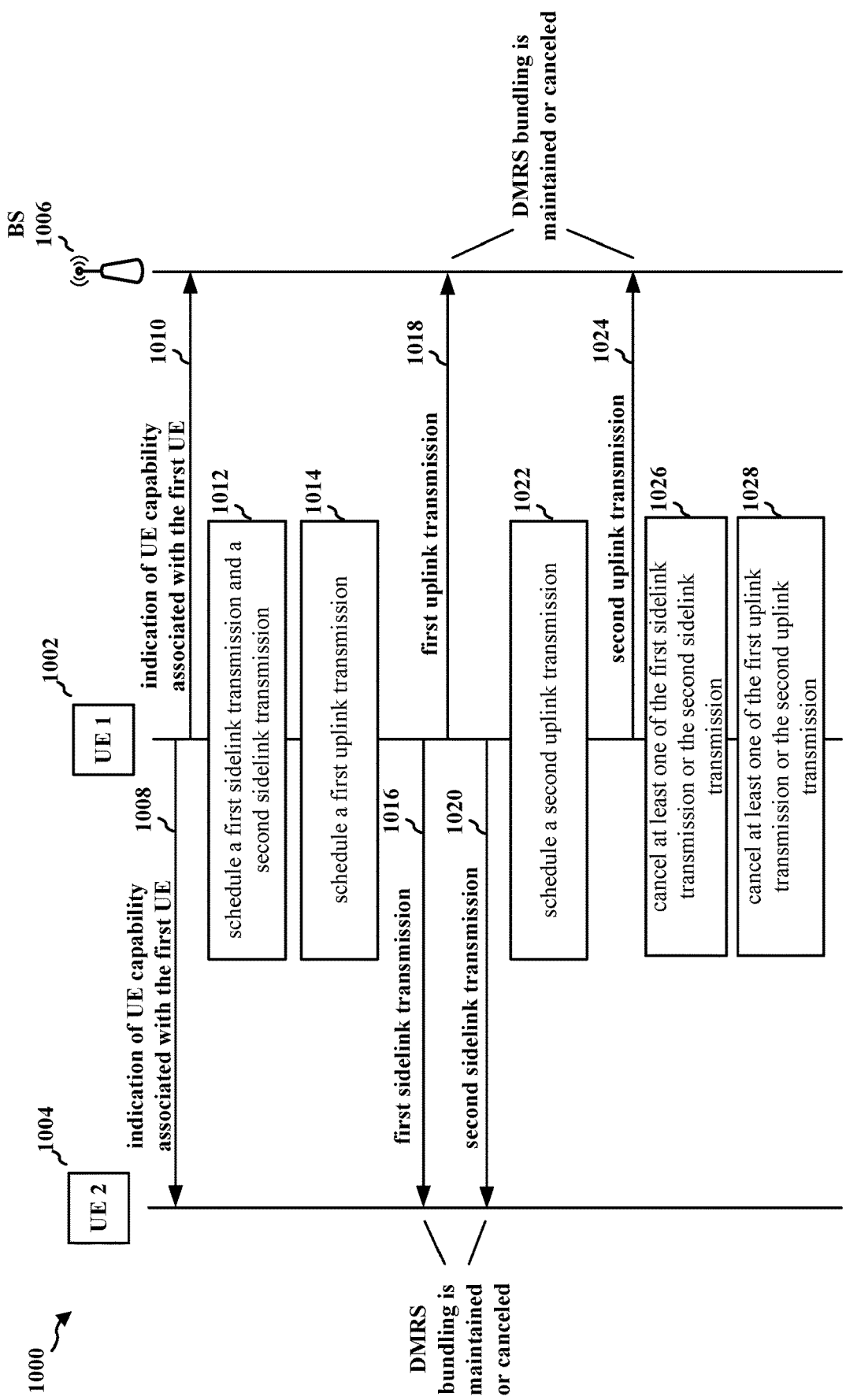
FIG. 10 is a diagram of a communication flow of a method of wireless communication.

FIG. 10 is a diagram of a communication flow 1000 of a method of wireless communication. At 1008 and/or 1010, the first UE 1002 may transmit, to a base station 1006 or the second UE 1004, an indication of UE capability associated with the first UE 1002. For example, the first UE 1002 may indicate, to at least one of the base station 1006 or the second UE 1004, whether or not the first UE 1002 is capable of maintaining one or both of the bundling of the DMRSs associated with the sidelink transmissions and the bundling of the DMRSs associated with the uplink transmissions. The UE capability to maintain DMRS bundling may be in relation to at least one of a frequency range, a band, a band combination, a carrier, or a carrier combination.

At 1012, the first UE 1002 may schedule a first sidelink transmission and a second sidelink transmission to the second UE 1004. A first DMRS associated with the first sidelink transmission and a second DMRS associated with the second sidelink transmission may be bundled for channel estimation associated with the second UE 1004.

At 1014, the first UE 1002 may schedule a first uplink transmission to the base station 1006. The first uplink transmission may be TDMed or FDMed with at least one of the first sidelink transmission or the second sidelink transmission.

In one configuration, the scheduled first uplink transmission may be TDMed with the first sidelink transmission and the second sidelink transmission. The scheduled first uplink transmission may be located, in time, in a time gap between the first sidelink transmission and the second sidelink transmission.

In one configuration, the time gap may be greater than a threshold (e.g., 14 symbols). At 1018, the first UE 1002 may transmit, to the base station 1006, the first uplink transmission. At 1016 and 1020, the first UE 1002 may transmit, to the second UE 1004, the first sidelink transmission and the second sidelink transmission. In this configuration, the bundling of the first DMRS and the second DMRS may be canceled.

In one configuration, the time gap may be less than the threshold (e.g., 14 symbols). At 1028, the first UE 1002 may cancel the first uplink transmission. At 1016 and 1020, the first UE 1002 may transmit, to the second UE 1004, the first sidelink transmission and the second sidelink transmission. In this configuration, the bundling of the first DMRS and the second DMRS may be maintained. In one configuration, the first uplink transmission may be canceled based on a priority of the first uplink transmission being less than a priority threshold.

In one configuration, the time gap may be less than the threshold (e.g., 14 symbols). At 1018, the first UE 1002 may transmit, to the base station 1006, the first uplink transmission. At 1016 and 1020, the first UE 1002 may transmit, to the second UE 1004, the first sidelink transmission and the second sidelink transmission. In this configuration, the bundling of the first DMRS and the second DMRS may be maintained based on the UE capability of the first UE 1002.

In one configuration, the scheduled first uplink transmission may be FDMed with one of the first sidelink transmission or the second sidelink transmission.

In one configuration, a third DMRS associated with the scheduled first uplink transmission may not be bundled with another DMRS for channel estimation. At 1018, the first UE 1002 may transmit, to a base station 1006, the first uplink transmission. At 1016 and 1020, the first UE 1002 may transmit, to the second UE 1004, the first sidelink transmission and the second sidelink transmission. In this configuration, the bundling of the first DMRS and the second DMRS may be maintained. The first UE 1002 may configure a second transmit power associated with the first uplink transmission subsequent to and based on configuring a first transmit power associated with the first sidelink transmission and the second sidelink transmission.

In one configuration, the scheduled first uplink transmission may correspond to a repetition. At 1028, the first UE 1002 may cancel the first uplink transmission. At 1016 and 1020, the first UE 1002 may transmit, to the second UE 1004, the first sidelink transmission and the second sidelink transmission. In this configuration, the bundling of the first DMRS and the second DMRS may be maintained.

In one configuration, a third DMRS associated with the scheduled first uplink transmission may not be bundled with another DMRS for channel estimation. At 1018, the first UE 1002 may cancel the first uplink transmission. At 1016 and 1020, the first UE 1002 may transmit, to the second UE 1004, the first sidelink transmission and the second sidelink transmission. In this configuration, the bundling of the first DMRS and the second DMRS may be canceled. Further, the first UE 1002 may transmit, to the second UE 1004 via an SCI message, an indication that the first DMRS and the second DMRS are not bundled for channel estimation.

In one configuration, at 1022, the first UE 1002 may schedule a second uplink transmission. A third DMRS associated with the scheduled first uplink transmission and a fourth DMRS associated with the scheduled second uplink transmission may be bundled for channel estimation associated with the base station. In one further configuration, at the same time, the scheduled first uplink transmission may be TDMed with the first sidelink transmission and the second sidelink transmission. The scheduled first uplink transmission may be located, in time, in a time gap between the first sidelink transmission and the second sidelink transmission.

In one configuration, at 1008 and/or 1010, the first UE 1002 may transmit, to the second UE 1004 or the base station 1006, an indication that the bundling of the first DMRS and the second DMRS and the bundling of the third DMRS and the fourth DMRS are simultaneously maintained.

In one configuration, the scheduled first uplink transmission may be FDMed with one of the first sidelink transmission or the second sidelink transmission. The scheduled second uplink transmission may be FDMed with the other of the first sidelink transmission or the second sidelink transmission.

In one configuration, at 1018 and 1024, the first UE 1002 may transmit, to the base station 1006, the first uplink transmission and the second uplink transmission. In this configuration, the bundling of the third DMRS and the fourth DMRS may be maintained. At 1016 and 1020, the first UE 1002 may transmit, to the second UE 1004, the first sidelink transmission and the second sidelink transmission. The first UE 1002 may configure a first transmit power associated with the first sidelink transmission and the second sidelink transmission subsequent to and based on configuring a second transmit power associated with the first uplink transmission and the second uplink transmission.

In one configuration, at 1018 and 1024, the first UE 1002 may transmit, to the base station 1006, the first uplink transmission and the second uplink transmission. In this configuration, the bundling of the third DMRS and the fourth DMRS may be maintained. At 1026, the first UE 1002 may cancel at least one of the first sidelink transmission or the second sidelink transmission.

In one configuration, at 1018 and 1024, the first UE 1002 may transmit, to a base station 1006, the first uplink transmission and the second uplink transmission. In this configuration, the bundling of the third DMRS and the fourth DMRS may be maintained. At 1016 and 1020, the first UE 1002 may transmit, to the second UE 1004, the first sidelink transmission and the second sidelink transmission. In this configuration, the bundling of the first DMRS and the second DMRS may be canceled. In one configuration, the first UE 1002 may transmit, to the second UE 1004 via an SCI message, an indication that the first DMRS and the second DMRS are not bundled for channel estimation.

In one configuration, at 1028, the first UE 1002 may cancel at least one of the first uplink transmission or the second uplink transmission. At 1016 and 1020, the first UE 1002 may transmit, to the second UE 1004, the first sidelink transmission and the second sidelink transmission. In this configuration, the bundling of the first DMRS and the second DMRS may be maintained.

In one configuration, at 1018 and 1024, the first UE 1002 may transmit, to a base station 1006, the first uplink transmission and the second uplink transmission. At 1016 and 1020, the first UE 1002 may transmit, to the second UE 1004, the first sidelink transmission and the second sidelink transmission. In this configuration, the bundling of the first DMRS and the second DMRS may be maintained. The first UE 1002 may configure a second transmit power associated with the first uplink transmission and the second uplink transmission subsequent to and based on configuring a first transmit power associated with the first sidelink transmission and the second sidelink transmission. In one configuration, at least one of the first uplink transmission or the second uplink transmission may correspond to a repetition.

Figure 11:
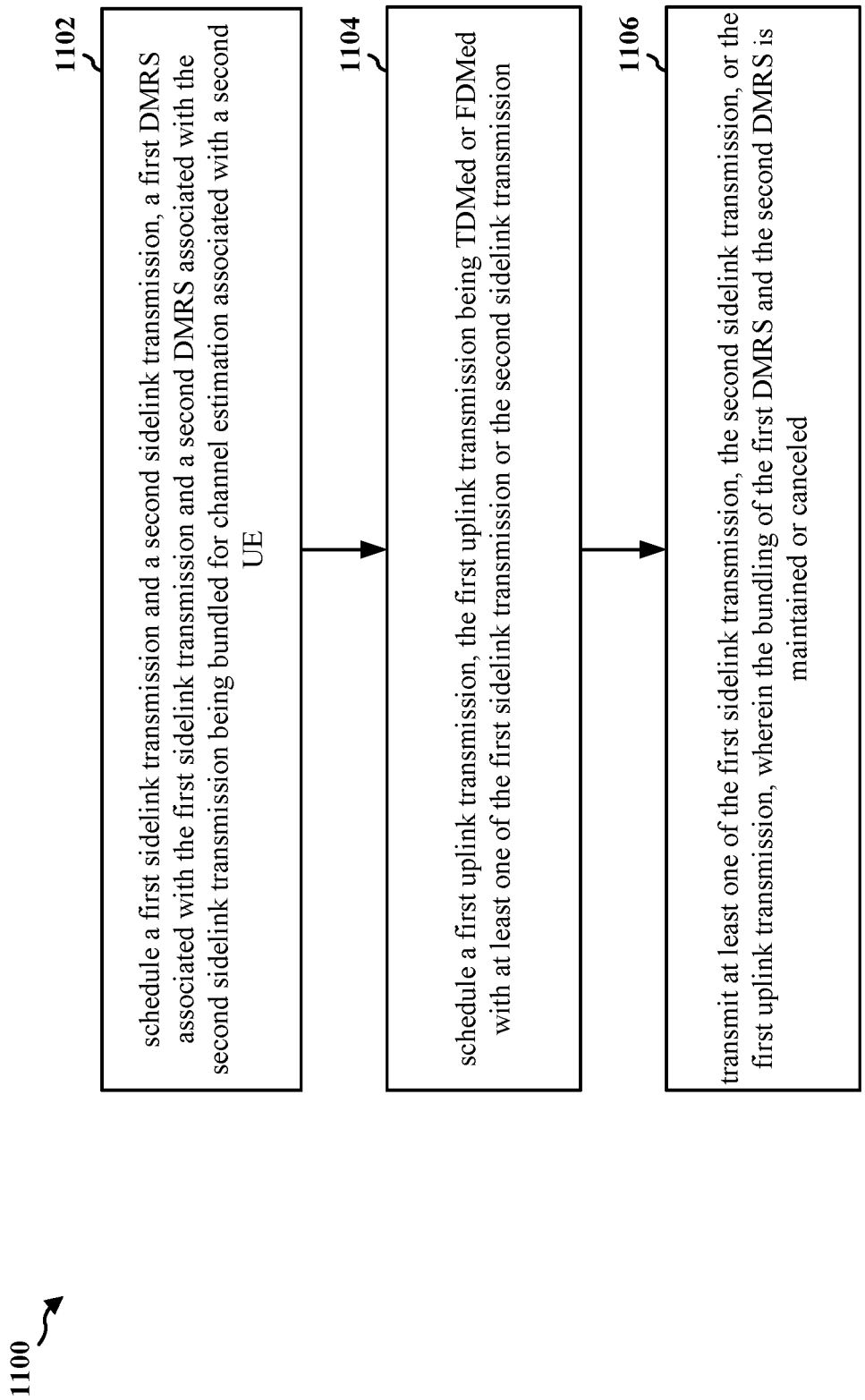
FIG. 11 is a flowchart of a method of wireless communication.

FIG. 11 is a flowchart 1100 of a method of wireless communication. The method may be performed by a first UE (e.g., the UE 104/350; the first UE 1002; the apparatus 1302). At 1102, the first UE may schedule a first sidelink transmission and a second sidelink transmission. A first DMRS associated with the first sidelink transmission and a second DMRS associated with the second sidelink transmission may be bundled for channel estimation associated with a second UE. For example, 1102 may be performed by the phase coherency component 1340 in FIG. 13. Referring to FIG. 10, at 1012, the first UE 1002 may schedule a first sidelink transmission and a second sidelink transmission.

At 1104, the first UE may schedule a first uplink transmission. The first uplink transmission may be TDMed or FDMed with at least one of the first sidelink transmission or the second sidelink transmission. For example, 1104 may be performed by the phase coherency component 1340 in FIG. 13. Referring to FIG. 10, at 1014, the first UE 1002 may schedule a first uplink transmission.

At 1106, the first UE may transmit at least one of the first sidelink transmission, the second sidelink transmission, or the first uplink transmission. The bundling of the first DMRS and the second DMRS may be maintained or canceled. For example, 1106 may be performed by the phase coherency component 1340 in FIG. 13. Referring to FIG. 10, at 1016, 1018, and/or 1020, the first UE 1002 may transmit at least one of the first sidelink transmission, the second sidelink transmission, or the first uplink transmission.

Figure 12:
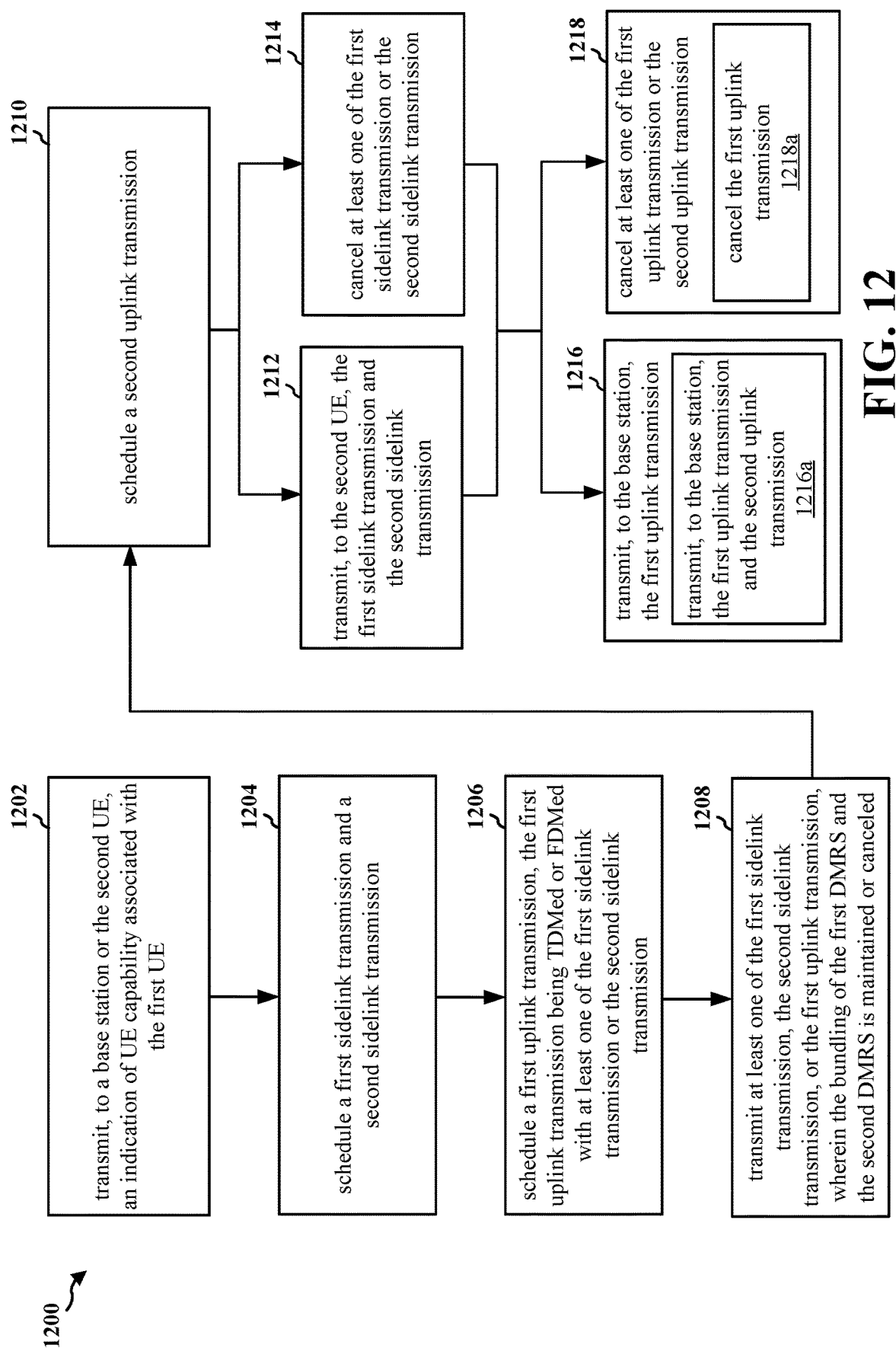
FIG. 12 is a flowchart of a method of wireless communication.

FIG. 12 is a flowchart 1200 of a method of wireless communication. The method may be performed by a first UE (e.g., the UE 104/350; the first UE 1002; the apparatus 1302). At 1204, the first UE may schedule a first sidelink transmission and a second sidelink transmission. A first DMRS associated with the first sidelink transmission and a second DMRS associated with the second sidelink transmission may be bundled for channel estimation associated with a second UE. For example, 1204 may be performed by the phase coherency component 1340 in FIG. 13. Referring to FIG. 10, at 1012, the first UE 1002 may schedule a first sidelink transmission and a second sidelink transmission.

At 1206, the first UE may schedule a first uplink transmission. The first uplink transmission may be TDMed or FDMed with at least one of the first sidelink transmission or the second sidelink transmission. For example, 1206 may be performed by the phase coherency component 1340 in FIG. 13. Referring to FIG. 10, at 1014, the first UE 1002 may schedule a first uplink transmission.

At 1208, the first UE may transmit at least one of the first sidelink transmission, the second sidelink transmission, or the first uplink transmission. The bundling of the first DMRS and the second DMRS may be maintained or canceled. For example, 1208 may be performed by the phase coherency component 1340 in FIG. 13. Referring to FIG. 10, at 1016, 1018, and/or 1020, the first UE 1002 may transmit at least one of the first sidelink transmission, the second sidelink transmission, or the first uplink transmission.

In one configuration, the scheduled first uplink transmission may be TDMed with the first sidelink transmission and the second sidelink transmission. The scheduled first uplink transmission may be located, in time, in a time gap between the first sidelink transmission and the second sidelink transmission.

In one configuration, in response to the time gap being greater than a threshold, at 1216, the first UE may transmit, to a base station, the first uplink transmission. For example, 1216 may be performed by the phase coherency component 1340 in FIG. 13. Referring to FIG. 10, at 1018, the first UE 1002 may transmit, to a base station 1006, the first uplink transmission. At 1212, the first UE may transmit, to the second UE, the first sidelink transmission and the second sidelink transmission. The bundling of the first DMRS and the second DMRS may be canceled. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, in response to the time gap being less than a threshold, at 1218a, the first UE may cancel the first uplink transmission. For example, 1218a may be performed by the phase coherency component 1340 in FIG. 13. Referring to FIG. 10, at 1026, the first UE 1002 may cancel the first uplink transmission. At 1212, the first UE may transmit, to the second UE, the first sidelink transmission and the second sidelink transmission. The bundling of the first DMRS and the second DMRS may be maintained. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, the first uplink transmission may be canceled based on a priority of the first uplink transmission being less than a priority threshold.

In one configuration, in response to the time gap being less than a threshold, at 1216, the first UE may transmit, to a base station, the first uplink transmission. For example, 1216 may be performed by the phase coherency component 1340 in FIG. 13. Referring to FIG. 10, at 1018, the first UE 1002 may transmit, to a base station 1006, the first uplink transmission. At 1212, the first UE may transmit, to the second UE, the first sidelink transmission and the second sidelink transmission. The bundling of the first DMRS and the second DMRS may be canceled. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, in response to the time gap being less than a threshold, at 1216, the first UE may transmit, to a base station, the first uplink transmission. For example, 1216 may be performed by the phase coherency component 1340 in FIG. 13. Referring to FIG. 10, at 1018, the first UE 1002 may transmit, to a base station 1006, the first uplink transmission. At 1212, the first UE may transmit, to the second UE, the first sidelink transmission and the second sidelink transmission. The bundling of the first DMRS and the second DMRS may be maintained based on a UE capability of the first UE. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, the scheduled first uplink transmission may be FDMed with one of the first sidelink transmission or the second sidelink transmission.

In one configuration, in response to a third DMRS associated with the scheduled first uplink transmission not being bundled with another DMRS for channel estimation, at 1216, the first UE may transmit, to a base station, the first uplink transmission. For example, 1216 may be performed by the phase coherency component 1340 in FIG. 13. Referring to FIG. 10, at 1018, the first UE 1002 may transmit, to a base station 1006, the first uplink transmission. At 1212, the first UE may transmit, to the second UE, the first sidelink transmission and the second sidelink transmission. The bundling of the first DMRS and the second DMRS may be maintained. A second transmit power associated with the first uplink transmission may be configured subsequent to and based on configuring a first transmit power associated with the first sidelink transmission and the second sidelink transmission. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, in response to the scheduled first uplink transmission corresponding to a repetition, at 1218a, the first UE may cancel the first uplink transmission. For example, 1218a may be performed by the phase coherency component 1340 in FIG. 13. Referring to FIG. 10, at 1026, the first UE 1002 may cancel the first uplink transmission. At 1212, the first UE may transmit, to the second UE, the first sidelink transmission and the second sidelink transmission. The bundling of the first DMRS and the second DMRS may be maintained. For example, 1212 may be performed by the phase coherency component 1340 in FIG. 13. Referring to FIG. 10, at 1016 and 1020, the first UE 1002 may transmit, to the second UE 1004, the first sidelink transmission and the second sidelink transmission.

In one configuration, in response to a third DMRS associated with the scheduled first uplink transmission not being bundled with another DMRS for channel estimation, at 1216, the first UE may transmit, to a base station, the first uplink transmission. For example, 1216 may be performed by the phase coherency component 1340 in FIG. 13. Referring to FIG. 10, at 1018, the first UE 1002 may transmit, to a base station 1006, the first uplink transmission. At 1212, the first UE may transmit, to the second UE, the first sidelink transmission and the second sidelink transmission. The bundling of the first DMRS and the second DMRS may be canceled. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, referring to FIG. 10, the first UE 1002 may transmit, to the second UE 1004 via an SCI message, an indication that the first DMRS and the second DMRS are not bundled for channel estimation.

In one configuration, at 1210, the first UE may schedule a second uplink transmission. A third DMRS associated with the scheduled first uplink transmission and a fourth DMRS associated with the scheduled second uplink transmission may be bundled for channel estimation associated with a base station. For example, 1210 may be performed by the phase coherency component 1340 in FIG. 13. Referring to FIG. 10, at 1022, the first UE 1002 may schedule a second uplink transmission.

In one configuration, referring to FIG. 10, the first UE 1002 may transmit, to the second UE 1004 or the base station 1006, an indication that the bundling of the first DMRS and the second DMRS and the bundling of the third DMRS and the fourth DMRS are simultaneously maintained.

In one configuration, the scheduled first uplink transmission may be FDMed with one of the first sidelink transmission or the second sidelink transmission. The scheduled second uplink transmission may be FDMed with the other of the first sidelink transmission or the second sidelink transmission.

In one configuration, at 1216a, the first UE may transmit, to the base station, the first uplink transmission and the second uplink transmission. The bundling of the third DMRS and the fourth DMRS may be maintained. For example, 1216a may be performed by the phase coherency component 1340 in FIG. 13. Referring to FIG. 10, at 1018 and 1024, the first UE 1002 may transmit, to the base station 1006, the first uplink transmission and the second uplink transmission. At 1212, the first UE may transmit, to the second UE, the first sidelink transmission and the second sidelink transmission. A first transmit power associated with the first sidelink transmission and the second sidelink transmission may be configured subsequent to and based on configuring a second transmit power associated with the first uplink transmission and the second uplink transmission. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, at 1216a, the first UE may transmit, to the base station, the first uplink transmission and the second uplink transmission. The bundling of the third DMRS and the fourth DMRS may be maintained. For example, 1216a may be performed by the phase coherency component 1340 in FIG. 13. Referring to FIGS. 10, at 1018 and 1024, the first UE 1002 may transmit, to the base station 1006, the first uplink transmission and the second uplink transmission. At 1214, the first UE may cancel at least one of the first sidelink transmission or the second sidelink transmission. For example, 1214 may be performed by the phase coherency component 1340 in FIG. 13. Referring to FIG. 10, at 1026, the first UE 1002 may cancel at least one of the first sidelink transmission or the second sidelink transmission.

In one configuration, at 1216a, the first UE may transmit, to the base station, the first uplink transmission and the second uplink transmission, wherein the bundling of the third DMRS and the fourth DMRS is maintained. For example, 1216*a* may be performed by the phase coherency component 1340 in FIG. 13. Referring to FIGS. 10, at 1018 and 1024, the first UE 1002 may transmit, to the base station 1006, the first uplink transmission and the second uplink transmission. At 1212, the first UE may transmit, to the second UE, the first sidelink transmission and the second sidelink transmission. The bundling of the first DMRS and the second DMRS may be canceled. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, referring to FIG. 10, the first UE 1002 may transmit, to the second UE 1004 via an SCI message, an indication that the first DMRS and the second DMRS are not bundled for channel estimation.

In one configuration, in response to the scheduled first uplink transmission or the scheduled second uplink transmission corresponding to a repetition, at 1218, the first UE may cancel at least one of the first uplink transmission or the second uplink transmission. For example, 1218 may be performed by the phase coherency component 1340 in FIG. 13. Referring to FIG. 10, at 1028, the first UE 1002 may cancel at least one of the first uplink transmission or the second uplink transmission. At 1212, the first UE may transmit, to the second UE, the first sidelink transmission and the second sidelink transmission. The bundling of the first DMRS and the second DMRS may be maintained. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, at 1216*a*, the first UE may transmit, to the base station, the first uplink transmission and the second uplink transmission. For example, 1216*a* may be performed by the phase coherency component 1340 in FIG. 13. Referring to FIGS. 10, at 1018 and 1024, the first UE 1002 may transmit, to the base station 1006, the first uplink transmission and the second uplink transmission. At 1212, the first UE may transmit, to the second UE, the first sidelink transmission and the second sidelink transmission. The bundling of the first DMRS and the second DMRS may be maintained. A second transmit power associated with the first uplink transmission and the second uplink transmission may be configured subsequent to and based on configuring a first transmit power associated with the first sidelink transmission and the second sidelink transmission. For example, 1212 may be performed by the phase coherency component 1340 in FIG. 13. Referring to FIGS. 10, at 1016 and 1020, the first UE 1002 may transmit, to the second UE 1004, the first sidelink transmission and the second sidelink transmission.

In one configuration, at least one of the first uplink transmission or the second uplink transmission may correspond to a repetition.

In one configuration, the scheduled first uplink transmission may be TDMed with the first sidelink transmission and the second sidelink transmission. The scheduled first uplink transmission may be located, in time, in a time gap between the first sidelink transmission and the second sidelink transmission.

In one configuration, at 1202, the first UE may transmit, to a base station or the second UE, an indication of UE capability associated with the first UE. The UE capability may correspond to an ability of the first UE to maintain a bundling of the first DMRS and the second DMRS. For example, 1202 may be performed by the phase coherency component 1340 in FIG. 13. Referring to FIG. 10, at 1008 and/or 1010, the first UE 1002 may transmit, to a base station 1006 or the second UE 1004, an indication of UE capability associated with the first UE 1002.

In one configuration, referring to FIG. 10, the indication of UE capability associated with the first UE 1002 may be associated with at least one of a frequency range, a band, a band combination, a carrier, or a carrier combination.

Figure 13:
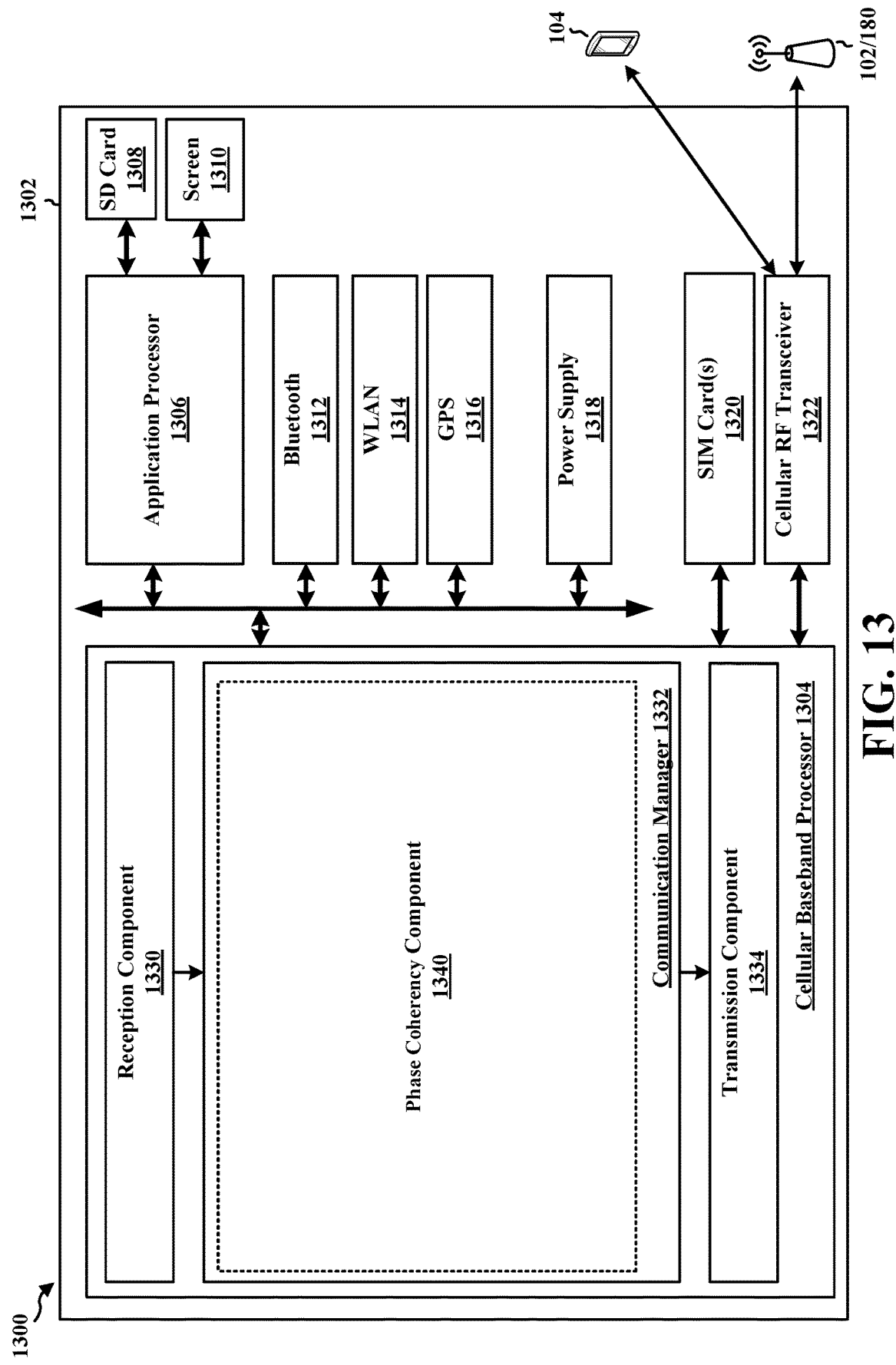
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a phase coherency component 1340 that may be configured to transmit, to a base station or the second UE, an indication of UE capability associated with the first UE, e.g., as described in connection with 1202 in FIG. 10. The phase coherency component 1340 may be configured to schedule a first sidelink transmission and a second sidelink transmission, e.g., as described in connection with 1204 in FIG. 10. The phase coherency component 1340 may be configured to schedule a first uplink transmission, e.g., as described in connection with 1206 in FIG. 10. The phase coherency component 1340 may be configured to transmit at least one of the first sidelink transmission, the second sidelink transmission, or the first uplink transmission, e.g., as described in connection with 1208 in FIG. 10. The phase coherency component 1340 may be configured to schedule a second uplink transmission, e.g., as described in connection with 1210 in FIG. 10. The phase coherency component 1340 may be configured to transmit, to the second UE, the first sidelink transmission and the second sidelink transmission, e.g., as described in connection with 1212 in FIG. 10. The phase coherency component 1340 may be configured to cancel at least one of the first sidelink transmission or the second sidelink transmission, e.g., as described in connection with 1214 in FIG. 10. The phase coherency component 1340 may be configured to transmit, to a base station, the first uplink transmission, e.g., as described in connection with 1216 in FIG. 10. The phase coherency component 1340 may be configured to transmit, to the base station, the first uplink transmission and the second uplink transmission, e.g., as described in connection with 1216a in FIG. 10. The phase coherency component 1340 may be configured to cancel at least one of the first uplink transmission or the second uplink transmission, e.g., as described in connection with 1218 in FIG. 10. The phase coherency component 1340 may be configured to cancel the first uplink transmission, e.g., as described in connection with 1218a in FIG. 10.

The apparatus may include additional components that perform each of the blocks of the algorithm in the flowcharts of FIGS. 10-12. As such, each block in the flowcharts of FIGS. 10-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for scheduling a first sidelink transmission and a second sidelink transmission. A first DMRS associated with the first sidelink transmission and a second DMRS associated with the second sidelink transmission may be bundled for channel estimation associated with a second UE. The apparatus 1302, and in particular the cellular baseband processor 1304, includes means for scheduling a first uplink transmission. The first uplink transmission may be TDMed or FDMed with at least one of the first sidelink transmission or the second sidelink transmission. The apparatus 1302, and in particular the cellular baseband processor 1304, includes means for transmitting at least one of the first sidelink transmission, the second sidelink transmission, or the first uplink transmission. The bundling of the first DMRS and the second DMRS may be maintained or canceled.

In one configuration, the scheduled first uplink transmission may be TDMed with the first sidelink transmission and the second sidelink transmission. The scheduled first uplink transmission may be located, in time, in a time gap between the first sidelink transmission and the second sidelink transmission. In one configuration, in response to the time gap being greater than a threshold, the apparatus 1302, and in particular the cellular baseband processor 1304, includes means for transmitting, to a base station, the first uplink transmission. The apparatus 1302, and in particular the cellular baseband processor 1304, includes means for transmitting, to the second UE, the first sidelink transmission and the second sidelink transmission. The bundling of the first DMRS and the second DMRS may be canceled. In one configuration, in response to the time gap being less than a threshold, the apparatus 1302, and in particular the cellular baseband processor 1304, includes means for canceling the first uplink transmission. The apparatus 1302, and in particular the cellular baseband processor 1304, includes means for transmitting, to the second UE, the first sidelink transmission and the second sidelink transmission. The bundling of the first DMRS and the second DMRS may be maintained. In one configuration, the first uplink transmission may be canceled based on a priority of the first uplink transmission being less than a priority threshold. In one configuration, in response to the time gap being less than a threshold, the apparatus 1302, and in particular the cellular baseband processor 1304, includes means for transmitting, to a base station, the first uplink transmission. The apparatus 1302, and in particular the cellular baseband processor 1304, includes means for transmitting, to the second UE, the first sidelink transmission and the second sidelink transmission. The bundling of the first DMRS and the second DMRS may be canceled. In one configuration, in response to the time gap being less than a threshold, the apparatus 1302, and in particular the cellular baseband processor 1304, includes means for transmitting, to a base station, the first uplink transmission. The apparatus 1302, and in particular the cellular baseband processor 1304, includes means for transmitting, to the second UE, the first sidelink transmission and the second sidelink transmission. The bundling of the first DMRS and the second DMRS may be maintained based on a UE capability of the first UE. In one configuration, the scheduled first uplink transmission may be FDMed with one of the first sidelink transmission or the second sidelink transmission. In one configuration, in response to a third DMRS associated with the scheduled first uplink transmission not being bundled with another DMRS for channel estimation, the apparatus 1302, and in particular the cellular baseband processor 1304, includes means for transmitting, to a base station, the first uplink transmission. The apparatus 1302, and in particular the cellular baseband processor 1304, includes means for transmitting, to the second UE, the first sidelink transmission and the second sidelink transmission. The bundling of the first DMRS and the second DMRS may be maintained. A second transmit power associated with the first uplink transmission may be configured subsequent to and based on configuring a first transmit power associated with the first sidelink transmission and the second sidelink transmission. In one configuration, in response to the scheduled first uplink transmission corresponding to a repetition, the apparatus 1302, and in particular the cellular baseband processor 1304, includes means for canceling the first uplink transmission. The apparatus 1302, and in particular the cellular baseband processor 1304, includes means for transmitting, to the second UE, the first sidelink transmission and the second sidelink transmission. The bundling of the first DMRS and the second DMRS may be maintained. In one configuration, in response to a third DMRS associated with the scheduled first uplink transmission not being bundled with another DMRS for channel estimation, the apparatus 1302, and in particular the cellular baseband processor 1304, includes means for transmitting, to a base station, the first uplink transmission. The apparatus 1302, and in particular the cellular baseband processor 1304, includes means for transmitting, to the second UE, the first sidelink transmission and the second sidelink transmission. The bundling of the first DMRS and the second DMRS may be canceled. In one configuration, the apparatus 1302, and in particular the cellular baseband processor 1304, includes means for transmitting, to the second UE via an SCI message, an indication that the first DMRS and the second DMRS are not bundled for channel estimation. In one configuration, the apparatus 1302, and in particular the cellular baseband processor 1304, includes means for scheduling a second uplink transmission. A third DMRS associated with the scheduled first uplink transmission and a fourth DMRS associated with the scheduled second uplink transmission may be bundled for channel estimation associated with a base station. In one configuration, the apparatus 1302, and in particular the cellular baseband processor 1304, includes means for transmitting, to the second UE or the base station, an indication that the bundling of the first DMRS and the second DMRS and the bundling of the third DMRS and the fourth DMRS are simultaneously maintained. In one configuration, the scheduled first uplink transmission may be FDMed with one of the first sidelink transmission or the second sidelink transmission. The scheduled second uplink transmission may be FDMed with the other of the first sidelink transmission or the second sidelink transmission. In one configuration, the apparatus 1302, and in particular the cellular baseband processor 1304, includes means for transmitting, to the base station, the first uplink transmission and the second uplink transmission. The bundling of the third DMRS and the fourth DMRS may be maintained. The apparatus 1302, and in particular the cellular baseband processor 1304, includes means for transmitting, to the second UE, the first sidelink transmission and the second sidelink transmission. A first transmit power associated with the first sidelink transmission and the second sidelink transmission may be configured subsequent to and based on configuring a second transmit power associated with the first uplink transmission and the second uplink transmission. In one configuration, the apparatus 1302, and in particular the cellular baseband processor 1304, includes means for transmitting, to the base station, the first uplink transmission and the second uplink transmission. The bundling of the third DMRS and the fourth DMRS may be maintained. The apparatus 1302, and in particular the cellular baseband processor 1304, includes means for canceling at least one of the first sidelink transmission or the second sidelink transmission. In one configuration, the apparatus 1302, and in particular the cellular baseband processor 1304, includes means for transmitting, to the base station, the first uplink transmission and the second uplink transmission. The bundling of the third DMRS and the fourth DMRS may be maintained. The apparatus 1302, and in particular the cellular baseband processor 1304, includes means for transmitting, to the second UE, the first sidelink transmission and the second sidelink transmission. The bundling of the first DMRS and the second DMRS may be canceled. In one configuration, the apparatus 1302, and in particular the cellular baseband processor 1304, includes means for transmitting, to the second UE via an SCI message, an indication that the first DMRS and the second DMRS are not bundled for channel estimation. In one configuration, in response to the scheduled first uplink transmission or the scheduled second uplink transmission corresponding to a repetition, the apparatus 1302, and in particular the cellular baseband processor 1304, includes means for canceling at least one of the first uplink transmission or the second uplink transmission. The apparatus 1302, and in particular the cellular baseband processor 1304, includes means for transmitting, to the second UE, the first sidelink transmission and the second sidelink transmission. The bundling of the first DMRS and the second DMRS may be maintained. In one configuration, the apparatus 1302, and in particular the cellular baseband processor 1304, includes means for transmitting, to the base station, the first uplink transmission and the second uplink transmission. The apparatus 1302, and in particular the cellular baseband processor 1304, includes means for transmitting, to the second UE, the first sidelink transmission and the second sidelink transmission. The bundling of the first DMRS and the second DMRS may be maintained. A second transmit power associated with the first uplink transmission and the second uplink transmission may be configured subsequent to and based on configuring a first transmit power associated with the first sidelink transmission and the second sidelink transmission. In one configuration, at least one of the first uplink transmission or the second uplink transmission may correspond to a repetition. In one configuration, the scheduled first uplink transmission may be TDMed with the first sidelink transmission and the second sidelink transmission. The scheduled first uplink transmission may be located, in time, in a time gap between the first sidelink transmission and the second sidelink transmission. In one configuration, the apparatus 1302, and in particular the cellular baseband processor 1304, includes means for transmitting, to a base station or the second UE, an indication of UE capability associated with the first UE. The UE capability may correspond to an ability of the first UE to maintain a bundling of the first DMRS and the second DMRS. In one configuration, the indication of UE capability associated with the first UE may be associated with at least one of a frequency range, a band, a band combination, a carrier, or a carrier combination.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Referring back to FIGS. 4-13, a first UE may schedule a first sidelink transmission and a second sidelink transmission. A first DMRS associated with the first sidelink transmission and a second DMRS associated with the second sidelink transmission may be bundled for channel estimation associated with a second UE. The first UE may schedule a first uplink transmission. The first uplink transmission may be TDMed or FDMed with at least one of the first sidelink transmission or the second sidelink transmission. The first UE may transmit at least one of the first sidelink transmission, the second sidelink transmission, or the first uplink transmission. The bundling of the first DMRS and the second DMRS may be maintained or canceled. Accordingly, based on one or more factors described heretofore, the first UE may appropriately manage the phase coherency associated with multiple sidelink transmissions when one or more uplink transmissions may affect the maintenance of the sidelink phase coherency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to schedule a first sidelink transmission and a second sidelink transmission, a first DMRS associated with the first sidelink transmission and a second DMRS associated with the second sidelink transmission being bundled for channel estimation associated with a second UE; schedule a first uplink transmission, the first uplink transmission being TDMed or FDMed with at least one of the first sidelink transmission or the second sidelink transmission; and transmit at least one of the first sidelink transmission, the second sidelink transmission, or the first uplink transmission, where the bundling of the first DMRS and the second DMRS is maintained or canceled.

Aspect 2 is the apparatus of aspect 1, where the scheduled first uplink transmission is TDMed with the first sidelink transmission and the second sidelink transmission, and the scheduled first uplink transmission is located, in time, in a time gap between the first sidelink transmission and the second sidelink transmission.

Aspect 3 is the apparatus of aspect 2, where in response to the time gap being greater than a threshold, the at least one processor is further configured to: transmit, to a base station, the first uplink transmission; and transmit, to the second UE, the first sidelink transmission and the second sidelink transmission, where the bundling of the first DMRS and the second DMRS is canceled.

Aspect 4 is the apparatus of aspect 2, where in response to the time gap being less than a threshold, the at least one processor is further configured to: cancel the first uplink transmission; and transmit, to the second UE, the first sidelink transmission and the second sidelink transmission, where the bundling of the first DMRS and the second DMRS is maintained.

Aspect 5 is the apparatus of aspect 4, where the first uplink transmission is canceled based on a priority of the first uplink transmission being less than a priority threshold.

Aspect 6 is the apparatus of aspect 2, where in response to the time gap being less than a threshold, the at least one processor is further configured to: transmit, to a base station, the first uplink transmission; and transmit, to the second UE, the first sidelink transmission and the second sidelink transmission, where the bundling of the first DMRS and the second DMRS is canceled.

Aspect 7 is the apparatus of aspect 2, where in response to the time gap being less than a threshold, the at least one processor is further configured to: transmit, to a base station, the first uplink transmission; and transmit, to the second UE, the first sidelink transmission and the second sidelink transmission, where the bundling of the first DMRS and the second DMRS is maintained based on a UE capability of the first UE.

Aspect 8 is the apparatus of aspect 1, where the scheduled first uplink transmission is FDMed with one of the first sidelink transmission or the second sidelink transmission.

Aspect 9 is the apparatus of aspect 8, where in response to a third DMRS associated with the scheduled first uplink transmission not being bundled with another DMRS for channel estimation, the at least one processor is further configured to: transmit, to a base station, the first uplink transmission; and transmit, to the second UE, the first sidelink transmission and the second sidelink transmission, where the bundling of the first DMRS and the second DMRS is maintained, and a second transmit power associated with the first uplink transmission is configured subsequent to and based on configuring a first transmit power associated with the first sidelink transmission and the second sidelink transmission.

Aspect 10 is the apparatus of aspect 8, where in response to the scheduled first uplink transmission corresponding to a repetition, the at least one processor is further configured to: cancel the first uplink transmission; and transmit, to the second UE, the first sidelink transmission and the second sidelink transmission, where the bundling of the first DMRS and the second DMRS is maintained.

Aspect 11 is the apparatus of aspect 8, where in response to a third DMRS associated with the scheduled first uplink transmission not being bundled with another DMRS for channel estimation, the at least one processor is further configured to: transmit, to a base station, the first uplink transmission; and transmit, to the second UE, the first sidelink transmission and the second sidelink transmission, where the bundling of the first DMRS and the second DMRS is canceled.

Aspect 12 is the apparatus of aspect 11, the at least one processor being further configured to: transmit, to the second UE via an SCI message, an indication that the first DMRS and the second DMRS are not bundled for channel estimation.

Aspect 13 is the apparatus of any of aspects 1 to 12, where the at least one processor is further configured to schedule a second uplink transmission, and a third DMRS associated with the scheduled first uplink transmission and a fourth DMRS associated with the scheduled second uplink transmission are bundled for channel estimation associated with a base station.

Aspect 14 is the apparatus of aspect 13, the at least one processor being further configured to transmit, to the second UE or the base station, an indication that the bundling of the first DMRS and the second DMRS and the bundling of the third DMRS and the fourth DMRS are simultaneously maintained.

Aspect 15 is the apparatus of any of aspects 13 and 14, where the scheduled first uplink transmission is FDMed with one of the first sidelink transmission or the second sidelink transmission, and the scheduled second uplink transmission is FDMed with the other of the first sidelink transmission or the second sidelink transmission.

Aspect 16 is the apparatus of aspect 15, the at least one processor being further configured to: transmit, to the base station, the first uplink transmission and the second uplink transmission, where the bundling of the third DMRS and the fourth DMRS is maintained; and transmit, to the second UE, the first sidelink transmission and the second sidelink transmission, where a first transmit power associated with the first sidelink transmission and the second sidelink transmission is configured subsequent to and based on configuring a second transmit power associated with the first uplink transmission and the second uplink transmission.

Aspect 17 is the apparatus of aspect 15, the at least one processor being further configured to: transmit, to the base station, the first uplink transmission and the second uplink transmission, where the bundling of the third DMRS and the fourth DMRS is maintained; and cancel at least one of the first sidelink transmission or the second sidelink transmission.

Aspect 18 is the apparatus of aspect 15, the at least one processor being further configured to: transmit, to the base station, the first uplink transmission and the second uplink transmission, where the bundling of the third DMRS and the fourth DMRS is maintained; and transmit, to the second UE, the first sidelink transmission and the second sidelink transmission, where the bundling of the first DMRS and the second DMRS is canceled.

Aspect 19 is the apparatus of aspect 18, the at least one processor being further configured to: transmit, to the second UE via an SCI message, an indication that the first DMRS and the second DMRS are not bundled for channel estimation.

Aspect 20 is the apparatus of aspect 15, where in response to the scheduled first uplink transmission or the scheduled second uplink transmission corresponding to a repetition, the at least one processor is further configured to: cancel at least one of the first uplink transmission or the second uplink transmission; and transmit, to the second UE, the first sidelink transmission and the second sidelink transmission, where the bundling of the first DMRS and the second DMRS is maintained.

Aspect 21 is the apparatus of aspect 15, the at least one processor being further configured to: transmit, to the base station, the first uplink transmission and the second uplink transmission; and transmit, to the second UE, the first sidelink transmission and the second sidelink transmission, where the bundling of the first DMRS and the second DMRS is maintained, and a second transmit power associated with the first uplink transmission and the second uplink transmission is configured subsequent to and based on configuring a first transmit power associated with the first sidelink transmission and the second sidelink transmission.

Aspect 22 is the apparatus of aspect 21, where at least one of the first uplink transmission or the second uplink transmission corresponds to a repetition.

Aspect 23 is the apparatus of aspect 13, where the scheduled first uplink transmission is TDMed with the first sidelink transmission and the second sidelink transmission, and the scheduled first uplink transmission is located, in time, in a time gap between the first sidelink transmission and the second sidelink transmission.

Aspect 24 is the apparatus of any of aspects 1 to 23, the at least one processor being further configured to: transmit, to a base station or the second UE, an indication of UE capability associated with the first UE, the UE capability corresponding to an ability of the first UE to maintain a bundling of the first DMRS and the second DMRS.

Aspect 25 is the apparatus of aspect 24, where the indication of UE capability associated with the first UE is associated with at least one of a frequency range, a band, a band combination, a carrier, or a carrier combination.

Aspect 26 is the apparatus of aspect 1, further including a transceiver coupled to the at least one processor.

Aspect 27 is a method of wireless communication for implementing any of aspects 1 to 26.

Aspect 28 is an apparatus for wireless communication including means for implementing any of aspects 1 to 26.

Aspect 29 is a computer-readable medium storing computer executable code, where the code when executed by a processor causes the processor to implement any of aspects 1 to 26.

What is claimed is:

1. An apparatus for wireless communication at a first user equipment (UE), comprising:
   memory; and
   at least one processor coupled to the memory and configured to:
      schedule a first sidelink transmission and a second sidelink transmission, a first demodulation reference signal (DMRS) associated with the first sidelink transmission and a second DMRS associated with the second sidelink transmission being bundled for channel estimation associated with a second UE;
      schedule a first uplink transmission, the first uplink transmission being time division multiplexed (TDMed) or frequency division multiplexed (FDMed) with at least one of the first sidelink transmission or the second sidelink transmission; and
      transmit at least one of the first sidelink transmission, the second sidelink transmission, or the first uplink transmission, wherein the bundling of the first DMRS and the second DMRS is maintained or canceled.

2. The apparatus of claim 1, wherein the at least one processor is further configured to schedule a second uplink transmission, and a third DMRS associated with the scheduled first uplink transmission and a fourth DMRS associated with the scheduled second uplink transmission are bundled for channel estimation associated with a base station.

3. The apparatus of claim 2, wherein the scheduled first uplink transmission is FDMed with one of the first sidelink transmission or the second sidelink transmission, and the scheduled second uplink transmission is FDMed with the other of the first sidelink transmission or the second sidelink transmission.

4. The apparatus of claim 3, the at least one processor being further configured to:
    transmit, to the base station, the first uplink transmission and the second uplink transmission, wherein the bundling of the third DMRS and the fourth DMRS is maintained; and
    transmit, to the second UE, the first sidelink transmission and the second sidelink transmission, wherein the bundling of the first DMRS and the second DMRS is canceled.

5. The apparatus of claim 4, the at least one processor being further configured to:
    transmit, to the second UE via a sidelink control information (SCI) message, an indication that the first DMRS and the second DMRS are not bundled for channel estimation.

6. The apparatus of claim 3, the at least one processor being further configured to:
    transmit, to the base station, the first uplink transmission and the second uplink transmission; and
    transmit, to the second UE, the first sidelink transmission and the second sidelink transmission, wherein the bundling of the first DMRS and the second DMRS is maintained, and a second transmit power associated with the first uplink transmission and the second uplink transmission is configured subsequent to and based on configuring a first transmit power associated with the first sidelink transmission and the second sidelink transmission.

7. The apparatus of claim 6, wherein at least one of the first uplink transmission or the second uplink transmission corresponds to a repetition.

8. The apparatus of claim 3, the at least one processor being further configured to:
    transmit, to the base station, the first uplink transmission and the second uplink transmission, wherein the bundling of the third DMRS and the fourth DMRS is maintained; and
    transmit, to the second UE, the first sidelink transmission and the second sidelink transmission, wherein a first transmit power associated with the first sidelink transmission and the second sidelink transmission is configured subsequent to and based on configuring a second transmit power associated with the first uplink transmission and the second uplink transmission.

9. The apparatus of claim 3, the at least one processor being further configured to:
    transmit, to the base station, the first uplink transmission and the second uplink transmission, wherein the bundling of the third DMRS and the fourth DMRS is maintained; and
    cancel at least one of the first sidelink transmission or the second sidelink transmission.

10. The apparatus of claim 3, wherein in response to the scheduled first uplink transmission or the scheduled second uplink transmission corresponding to a repetition, the at least one processor is further configured to:
    cancel at least one of the first uplink transmission or the second uplink transmission; and
    transmit, to the second UE, the first sidelink transmission and the second sidelink transmission, wherein the bundling of the first DMRS and the second DMRS is maintained.

11. The apparatus of claim 2, the at least one processor being further configured to transmit, to the second UE or the base station, an indication that the bundling of the first DMRS and the second DMRS and the bundling of the third DMRS and the fourth DMRS are simultaneously maintained.

12. The apparatus of claim 1, wherein the scheduled first uplink transmission is TDMed with the first sidelink transmission and the second sidelink transmission, and the scheduled first uplink transmission is located, in time, in a time gap between the first sidelink transmission and the second sidelink transmission.

13. The apparatus of claim 12, wherein in response to the time gap being less than a threshold, the at least one processor is further configured to:
    cancel the first uplink transmission; and
    transmit, to the second UE, the first sidelink transmission and the second sidelink transmission, wherein the bundling of the first DMRS and the second DMRS is maintained.

14. The apparatus of claim 13, wherein the first uplink transmission is canceled based on a priority of the first uplink transmission being less than a priority threshold.

15. The apparatus of claim 12, wherein in response to the time gap being greater than a threshold, the at least one processor is further configured to:
    transmit, to a base station, the first uplink transmission; and
    transmit, to the second UE, the first sidelink transmission and the second sidelink transmission, wherein the bundling of the first DMRS and the second DMRS is canceled.

16. The apparatus of claim 12, wherein in response to the time gap being less than a threshold, the at least one processor is further configured to:
    transmit, to a base station, the first uplink transmission; and
    transmit, to the second UE, the first sidelink transmission and the second sidelink transmission, wherein the bundling of the first DMRS and the second DMRS is canceled.

17. The apparatus of claim 12, wherein in response to the time gap being less than a threshold, the at least one processor is further configured to:
    transmit, to a base station, the first uplink transmission; and
    transmit, to the second UE, the first sidelink transmission and the second sidelink transmission, wherein the bundling of the first DMRS and the second DMRS is maintained based on a UE capability of the first UE.

18. The apparatus of claim 1, wherein the scheduled first uplink transmission is FDMed with one of the first sidelink transmission or the second sidelink transmission.

19. The apparatus of claim 18, wherein in response to a third DMRS associated with the scheduled first uplink transmission not being bundled with another DMRS for channel estimation, the at least one processor is further configured to:
    transmit, to a base station, the first uplink transmission; and
    transmit, to the second UE, the first sidelink transmission and the second sidelink transmission, wherein the bundling of the first DMRS and the second DMRS is canceled.

20. The apparatus of claim 19, the at least one processor being further configured to:
    transmit, to the second UE via a sidelink control information (SCI) message, an indication that the first DMRS and the second DMRS are not bundled for channel estimation.

21. The apparatus of claim 18, wherein in response to a third DMRS associated with the scheduled first uplink transmission not being bundled with another DMRS for channel estimation, the at least one processor is further configured to:
transmit, to a base station, the first uplink transmission; and
transmit, to the second UE, the first sidelink transmission and the second sidelink transmission, wherein the bundling of the first DMRS and the second DMRS is maintained, and a second transmit power associated with the first uplink transmission is configured subsequent to and based on configuring a first transmit power associated with the first sidelink transmission and the second sidelink transmission.

22. The apparatus of claim 18, wherein in response to the scheduled first uplink transmission corresponding to a repetition, the at least one processor is further configured to:
cancel the first uplink transmission; and
transmit, to the second UE, the first sidelink transmission and the second sidelink transmission, wherein the bundling of the first DMRS and the second DMRS is maintained.

23. The apparatus of claim 1, the at least one processor being further configured to:
transmit, to a base station or the second UE, an indication of UE capability associated with the first UE, the UE capability corresponding to an ability of the first UE to maintain a bundling of the first DMRS and the second DMRS.

24. The apparatus of claim 23, wherein the indication of UE capability associated with the first UE is associated with at least one of a frequency range, a band, a band combination, a carrier, or a carrier combination.

25. The apparatus of claim 1, wherein the scheduled first uplink transmission is TDMed with the first sidelink transmission and the second sidelink transmission, and the scheduled first uplink transmission is located, in time, in a time gap between the first sidelink transmission and the second sidelink transmission.

26. The apparatus of claim 1, further comprising a transceiver coupled to the at least one processor.

27. A method of wireless communication at a first user equipment (UE), comprising:
scheduling a first sidelink transmission and a second sidelink transmission, a first demodulation reference signal (DMRS) associated with the first sidelink transmission and a second DMRS associated with the second sidelink transmission being bundled for channel estimation associated with a second UE;
scheduling a first uplink transmission, the first uplink transmission being time division multiplexed (TDMed) or frequency division multiplexed (FDMed) with at least one of the first sidelink transmission or the second sidelink transmission; and
transmitting at least one of the first sidelink transmission, the second sidelink transmission, or the first uplink transmission, wherein the bundling of the first DMRS and the second DMRS is maintained or canceled.

28. The method of claim 27, wherein the scheduled first uplink transmission is TDMed with the first sidelink transmission and the second sidelink transmission, and the scheduled first uplink transmission is located, in time, in a time gap between the first sidelink transmission and the second sidelink transmission.

29. An apparatus for wireless communication at a first user equipment (UE), comprising:
means for scheduling a first sidelink transmission and a second sidelink transmission, a first demodulation reference signal (DMRS) associated with the first sidelink transmission and a second DMRS associated with the second sidelink transmission being bundled for channel estimation associated with a second UE;
means for scheduling a first uplink transmission, the first uplink transmission being time division multiplexed (TDMed) or frequency division multiplexed (FDMed) with at least one of the first sidelink transmission or the second sidelink transmission; and
means for transmitting at least one of the first sidelink transmission, the second sidelink transmission, or the first uplink transmission, wherein the bundling of the first DMRS and the second DMRS is maintained or canceled.

30. A non-transitory computer-readable medium storing computer executable code at a first user equipment (UE), the code when executed by a processor causes the processor to:
schedule a first sidelink transmission and a second sidelink transmission, a first demodulation reference signal (DMRS) associated with the first sidelink transmission and a second DMRS associated with the second sidelink transmission being bundled for channel estimation associated with a second UE;
schedule a first uplink transmission, the first uplink transmission being time division multiplexed (TDMed) or frequency division multiplexed (FDMed) with at least one of the first sidelink transmission or the second sidelink transmission; and
transmit at least one of the first sidelink transmission, the second sidelink transmission, or the first uplink transmission, wherein the bundling of the first DMRS and the second DMRS is maintained or canceled.

* * * * *